US012712603B2

(12) United States Patent
Xiao et al.

(10) Patent No.: US 12,712,603 B2
(45) Date of Patent: Aug. 18, 2026

(54) CODEBOOK-BASED SOUNDING REFERENCE SIGNAL AND PRECODING MATRIX INDICATOR CONFIGURATIONS

(71) Applicant: QUALCOMM Incorporated, San Diego, CA (US)

(72) Inventors: Kexin Xiao, Shanghai (CN); Hyojin Lee, San Diego, CA (US); Yu Zhang, San Diego, CA (US); Yi Huang, San Diego, CA (US); Muhammad Sayed Khairy Abdelghaffar, San Jose, CA (US); Runxin Wang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 18/291,521

(22) PCT Filed: Sep. 29, 2021

(86) PCT No.: PCT/CN2021/121567

§ 371 (c)(1),
(2) Date: Jan. 23, 2024

(87) PCT Pub. No.: WO2023/050117

PCT Pub. Date: Apr. 6, 2023

(65) Prior Publication Data

US 2024/0356588 A1 Oct. 24, 2024

(51) Int. Cl.
*H04W 72/23* (2023.01)
*H04B 7/0404* (2017.01)
*H04B 7/0456* (2017.01)

(52) U.S. Cl.
CPC ......... *H04B 7/0404* (2013.01); *H04B 7/0456* (2013.01)

(58) Field of Classification Search
CPC ............. H04W 72/0453; H04W 72/23; H04W 72/0446; H04B 7/0486; H04B 7/0639;
(Continued)

(56) References Cited

U.S. PATENT DOCUMENTS 11,218,340 B2 1/2022 Wu et al.
2021/0051608 A1 2/2021 Sridharan et al.
(Continued)

FOREIGN PATENT DOCUMENTS

CN 102293043 A 12/2011
CN 110100407 A 8/2019
(Continued)

OTHER PUBLICATIONS

International Search Report and Written Opinion—PCT/CN2021/121567—ISA/EPO—May 25, 2022.
(Continued)

*Primary Examiner* — Anez C Ebrahim
(74) *Attorney, Agent, or Firm* — Holland & Hart LLP

(57) ABSTRACT

Methods, systems, and devices for wireless communications are described. Generally, a user equipment (UE) may communicate on first and second carriers, and may support either two transmit chains or three transmit chains on a second carrier. A base station may configure different sounding reference signal (SRS) resources for different numbers of transmit chains. SRS resources configured with two ports may indicate two transmit chains, and SRS resource configured with three ports may indicate three transmit chains. The base station may indicate an index associated with an SRS resource, and the UE may select (e.g., based on a mapping between the SRS resource index and a number of SRS ports and a number of transmit chains), a corresponding SRS resource, number of ports, number of transmit chains, or any combination thereof. The base station may indicate a
(Continued)

number of transmit chains for a given SRS resource based on a PMI index.

26 Claims, 23 Drawing Sheets

(58) Field of Classification Search
CPC .... H04B 7/063; H04B 7/0623; H04B 7/0404; H04B 7/0456; H04L 5/0051; H04L 5/0094
See application file for complete search history.

(56) References Cited

U.S. PATENT DOCUMENTS

2021/0135730 A1* 5/2021 Chai ................. H04W 72/0453
2021/0153143 A1 5/2021 Sridharan et al.
2021/0281448 A1 9/2021 Li et al.
2022/0109474 A1 4/2022 Haghighat et al.
2023/0421414 A1* 12/2023 Sun ....................... H04L 5/0023

FOREIGN PATENT DOCUMENTS

CN 110999476 A 4/2020
CN 112585901 A 3/2021
WO WO-2021035389 A1 3/2021

OTHER PUBLICATIONS

NTT Docomo, Inc: "Discussion on SRS Enhancement", 3GPP TSG RAN WG1 #104b-e, R1- 2103564, e-Meeting, Apr. 12-20, 2021, 14 Pages, the whole document.

* cited by examiner

| Slot # | 0 | 1 | 2 | 3 | 4 | 5 | 6 | 7 | 8 | 9 |
| --- | --- | --- | --- | --- | --- | --- | --- | --- | --- | --- |
| Carrier 2 | D | D | D | S | U | D | D | S | U | U |

| Slot # | 0 | 1 | 2 | 3 | 4 |
| --- | --- | --- | --- | --- | --- |
| Carrier 1 | U | U | U | U | |

| Slot # | 0 | 1 | 2 | 3 | 4 | 5 | 6 | 7 | 8 | 9 |
| --- | --- | --- | --- | --- | --- | --- | --- | --- | --- | --- |
| Carrier 2 | D | D | D | S | U | D | D | S | U | U |

| Slot # | 0 | 1 | 2 | 3 | 4 |
| --- | --- | --- | --- | --- | --- |
| Carrier 1 | U | U | U | U | |

CODEBOOK-BASED SOUNDING REFERENCE SIGNAL AND PRECODING MATRIX INDICATOR CONFIGURATIONS

CROSS REFERENCE

The present Application is a 371 national stage filing of International PCT Application No. PCT/CN2021/121567 by XIAO et al. entitled "CODEBOOK-BASED SOUNDING REFERENCE SIGNAL AND PRECODING MATRIX INDICATOR CONFIGURATIONS," filed Sep. 29, 2021, which is assigned to the assignee hereof, and which is expressly incorporated by reference in its entirety herein.

FIELD OF TECHNOLOGY

The following relates to wireless communications, including codebook-based sounding reference signal and precoding matrix indicator configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support codebook-based sounding reference signal and precoding matrix indicator configurations. Generally, a user equipment (UE) may support a first number of transmit chains (e.g., two transmit chains) on a first component carrier, and a second number of transmit chains (e.g., three transmit chains, but not two transmit chains) on a second carrier. In such examples, the base station may configure codebook based SRS configurations for two transmit chains on the first carrier, and codebook based SRS configurations for three transmit chains on the second carrier. Additionally, or alternatively, the base station may configure the UE with a precoding matrix indicator (PMI) table for three transmit chains that is different than a PMI table for two transmit chains. For transmissions on the second carrier (e.g., using three transmit chains), the base station may indicate (e.g., in a downlink control information (DCI) message) a PMI from the PMI table for three transmit chains.

In some examples, the UE may support either two transmit chains or three transmit chains on the second carrier. In such examples, the base station may configure different SRS resources for different numbers of transmit chains. For instance, SRS resource configured with two ports may indicate two transmit chains, and SRS resource configured with three ports may indicate three transmit chains. In some examples, different SRS resources may be configured for two transmit chains, and other SRS resources may be configured for three transmit chains (e.g., in a same SRS resource or in two different SRS resource sets). In such examples, the base station may indicate (e.g., via DCI signaling) an index associated with an SRS resource, and the UE may select (e.g., based on a configured mapping between the SRS resource index and a number of SRS ports and a number of transmit chains), a corresponding SRS resource, number of ports, number of transmit chains, or any combination thereof.

In some examples, the UE may support either two transmit chains or three transmit chains on the second carrier, and the base station may indicate a number of transmit chains for a given SRS resource based on a PMI index. For example, the base station may configure one or more SRS resources (e.g., in one or more SRS resource sets), and may configure each SRS resource with a number of ports (e.g., one port, two ports, or three ports). The base station may indicate (e.g., via DCI signaling), an SRS resource index and a PMI index for transmitting SRSs. The PMI index may indicate whether the UE is to use two transmit chains or three transmit chains for transmitting SRSs on the indexed SRS resource (e.g., if each value of a last row in the matrix of the PMI is set to zero, then the UE may use two transmit chains, and may otherwise use three transmit chains).

A method for wireless communications at a user equipment (UE) is described. The method may include transmitting, to a base station, a message indicating that the UE is capable of supporting multiple sounding reference signal resources in one sounding reference signal resource set associated with differing numbers of antenna ports, receiving, from the base station, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set, receiving, from the base station, an uplink grant indicating a sounding reference signal resource index corresponding to the first sounding reference signal resource, and transmitting, via the first sounding reference signal resource, a set of multiple sounding reference signals via the first number of antenna ports using the first number of transmit chains.

An apparatus for wireless communications at a UE is described. The apparatus may include a processor, memory coupled with the processor, and instructions stored in the memory. The instructions may be executable by the processor to cause the apparatus to transmit, to a base station, a message indicating that the UE is capable of supporting multiple sounding reference signal resources in one sounding reference signal resource set associated with differing numbers of antenna ports, receive, from the base station, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set, receive, from the base station, an uplink grant indicating a sounding reference signal resource index corresponding to the first sounding reference signal resource, and transmit, via the first sounding reference signal resource, a set of multiple sounding reference signals via the first number of antenna ports using the first number of transmit chains.

Another apparatus for wireless communications at a UE is described. The apparatus may include means for transmitting, to a base station, a message indicating that the UE is capable of supporting multiple sounding reference signal resources in one sounding reference signal resource set associated with differing numbers of antenna ports, means for receiving, from the base station, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set, means for receiving, from the base station, an uplink grant indicating a sounding reference signal resource index corresponding to the first sounding reference signal resource, and means for transmitting, via the first sounding reference signal resource, a set of multiple sounding reference signals via the first number of antenna ports using the first number of transmit chains.

A non-transitory computer-readable medium storing code for wireless communications at a UE is described. The code may include instructions executable by a processor to transmit, to a base station, a message indicating that the UE is capable of supporting multiple sounding reference signal resources in one sounding reference signal resource set associated with differing numbers of antenna ports, receive, from the base station, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set, receive, from the base station, an uplink grant indicating a sounding reference signal resource index corresponding to the first sounding reference signal resource, and transmit, via the first sounding reference signal resource, a set of multiple sounding reference signals via the first number of antenna ports using the first number of transmit chains.

In some examples of the method, apparatuses, and non-transitory computer-readable medium described herein, receiving the control signaling may include operations, features, means, or instructions for receiving the control signaling indicating a mapping of the first number of transmit chains to the second sounding reference signal resource of the sounding reference signal resource set.

In some examples of the method, apparatuses, and non-transitory computer-readable medium described herein, receiving the control signaling may include operations, features, means, or instructions for receiving the control signaling indicating a mapping of a second number of transmit chains to the second sounding reference signal resource of the sounding reference signal resource set.

In some examples of the method, apparatuses, and non-transitory computer-readable medium described herein, receiving the uplink grant may include operations, features, means, or instructions for receiving a downlink control information message including the uplink grant and an indication of a precoding matrix indicator for transmitting the set of multiple sounding reference signal.

Some examples of the method, apparatuses, and non-transitory computer-readable medium described herein may further include operations, features, means, or instructions for precoding the set of multiple sounding reference signals according to the precoding matrix indicator, where transmitting the set of multiple sounding reference signals may be based on the precoding.

Some examples of the method, apparatuses, and non-transitory computer-readable medium described herein may further include operations, features, means, or instructions for receiving, from the base station, control signaling indicating a set of precoding matrix indicators, where the indication of the precoding matrix indicator may be one of the set of precoding matrix indicators.

In some examples of the method, apparatuses, and non-transitory computer-readable medium described herein, transmitting the set of multiple sounding reference signals may include operations, features, means, or instructions for transmitting the set of multiple sounding reference signals on a single component carrier.

Some examples of the method, apparatuses, and non-transitory computer-readable medium described herein may further include operations, features, means, or instructions for receiving, from the base station, an indication to use three antenna ports for transmissions on a single component carrier supporting a second number of transmit chains, where the second number of transmit chains includes three transmit chains.

In some examples of the method, apparatuses, and non-transitory computer-readable medium described herein, the first number of transmit chains may be two transmit chains and a second number of transmit chains may be three transmit chains.

In some examples of the method, apparatuses, and non-transitory computer-readable medium described herein, the first number of transmit chains may be three transmit chains and the second number of transmit chains may be two transmit chains.

A method for wireless communications at a base station is described. The method may include receiving, from a UE, a message indicating that the UE is capable of supporting multiple sounding reference signal resources in one sounding reference signal resource set associated with differing numbers of antenna ports, transmitting, to the UE, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set, transmitting, to the UE, an uplink grant indicating a sounding reference signal resource index corresponding to the first sounding reference signal resource, and receiving, via the first sounding reference signal resource, a set of multiple sounding reference signals via the first number of antenna ports using the first number of transmit chains.

An apparatus for wireless communications at a base station is described. The apparatus may include a processor, memory coupled with the processor, and instructions stored in the memory. The instructions may be executable by the processor to cause the apparatus to receive, from a UE, a message indicating that the UE is capable of supporting multiple sounding reference signal resources in one sounding reference signal resource set associated with differing numbers of antenna ports, transmit, to the UE, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set, transmit, to the UE, an uplink grant indicating a sounding reference signal resource index corresponding to the first sounding reference signal resource, and receive, via the first sounding reference signal resource, a set of multiple sounding reference signals via the first number of antenna ports using the first number of transmit chains.

Another apparatus for wireless communications at a base station is described. The apparatus may include means for receiving, from a UE, a message indicating that the UE is capable of supporting multiple sounding reference signal resources in one sounding reference signal resource set associated with differing numbers of antenna ports, means for transmitting, to the UE, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set, means for transmitting, to the UE, an uplink grant indicating a sounding reference signal resource index corresponding to the first sounding reference signal resource, and means for receiving, via the first sounding reference signal resource, a set of multiple sounding reference signals via the first number of antenna ports using the first number of transmit chains.

A non-transitory computer-readable medium storing code for wireless communications at a base station is described. The code may include instructions executable by a processor to receive, from a UE, a message indicating that the UE is capable of supporting multiple sounding reference signal resources in one sounding reference signal resource set associated with differing numbers of antenna ports, transmit, to the UE, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set, transmit, to the UE, an uplink grant indicating a sounding reference signal resource index corresponding to the first sounding reference signal resource, and receive, via the first sounding reference signal resource, a set of multiple sounding reference signals via the first number of antenna ports using the first number of transmit chains.

In some examples of the method, apparatuses, and non-transitory computer-readable medium described herein, transmitting the control signaling may include operations, features, means, or instructions for transmitting the control signaling indicating a mapping of the first number of transmit chains to the second sounding reference signal resource of the sounding reference signal resource set.

In some examples of the method, apparatuses, and non-transitory computer-readable medium described herein, transmitting the control signaling may include operations, features, means, or instructions for transmitting the control signaling indicating a mapping of a second number of transmit chains to the second sounding reference signal resource of the sounding reference signal resource set.

In some examples of the method, apparatuses, and non-transitory computer-readable medium described herein, transmitting the uplink grant may include operations, features, means, or instructions for transmitting a downlink control information message including the uplink grant and an indication of a precoding matrix indicator for transmitting the set of multiple sounding reference signal.

Some examples of the method, apparatuses, and non-transitory computer-readable medium described herein may further include operations, features, means, or instructions for transmitting, to the UE, control signaling indicating a set of precoding matrix indicators, where the indication of the precoding matrix indicator may be one of the set of precoding matrix indicators.

In some examples of the method, apparatuses, and non-transitory computer-readable medium described herein, receiving the set of multiple sounding reference signals may include operations, features, means, or instructions for receiving the set of multiple sounding reference signals on a single component carrier.

Some examples of the method, apparatuses, and non-transitory computer-readable medium described herein may further include operations, features, means, or instructions for transmitting, to the UE, an indication to use three antenna ports for transmissions on a single component carrier supporting a second number of transmit chains, where the second number of transmit chains includes three transmit chains.

In some examples of the method, apparatuses, and non-transitory computer-readable medium described herein, the first number of transmit chains may be two transmit chains and a second number of transmit chains may be three transmit chains.

In some examples of the method, apparatuses, and non-transitory computer-readable medium described herein, the first number of transmit chains may be three transmit chains and the second number of transmit chains may be two transmit chains.

A method for wireless communications at a UE is described. The method may include transmitting, to a base station, a message indicating that the UE is capable of supporting multiple sounding reference signal resources in one sounding reference signal resource set associated with differing numbers of antenna ports, receiving, from the base station, control signaling indicating a first mapping of a first number of one or more antenna ports to a first sounding reference signal resource of a set of multiple sounding reference signal resources of a sounding reference signal resource set, receiving, from the base station, an uplink grant indicating a sounding reference signal resource index corresponding to the first sounding reference signal resource and indicating a precoding matrix indicator corresponding to a first number of transmit chains, and transmitting, via the first sounding reference signal resource and in accordance with the precoding matrix indicator, a set of multiple sounding reference signals via the first number of one or more antenna ports using the first number of transmit chains.

An apparatus for wireless communications at a UE is described. The apparatus may include a processor, memory coupled with the processor, and instructions stored in the memory. The instructions may be executable by the processor to cause the apparatus to transmit, to a base station, a message indicating that the UE is capable of supporting multiple sounding reference signal resources in one sounding reference signal resource set associated with differing numbers of antenna ports, receive, from the base station, control signaling indicating a first mapping of a first number of one or more antenna ports to a first sounding reference signal resource of a set of multiple sounding reference signal resources of a sounding reference signal resource set, receive, from the base station, an uplink grant indicating a sounding reference signal resource index corresponding to the first sounding reference signal resource and indicating a precoding matrix indicator corresponding to a first number of transmit chains, and transmit, via the first sounding reference signal resource and in accordance with the precoding matrix indicator, a set of multiple sounding reference signals via the first number of one or more antenna ports using the first number of transmit chains.

Another apparatus for wireless communications at a UE is described. The apparatus may include means for transmitting, to a base station, a message indicating that the UE is capable of supporting multiple sounding reference signal resources in one sounding reference signal resource set associated with differing numbers of antenna ports, means for receiving, from the base station, control signaling indicating a first mapping of a first number of one or more antenna ports to a first sounding reference signal resource of a set of multiple sounding reference signal resources of a sounding reference signal resource set, means for receiving, from the base station, an uplink grant indicating a sounding reference signal resource index corresponding to the first sounding reference signal resource and indicating a precoding matrix indicator corresponding to a first number of transmit chains, and means for transmitting, via the first sounding reference signal resource and in accordance with the precoding matrix indicator, a set of multiple sounding reference signals via the first number of one or more antenna ports using the first number of transmit chains.

A non-transitory computer-readable medium storing code for wireless communications at a UE is described. The code may include instructions executable by a processor to transmit, to a base station, a message indicating that the UE is capable of supporting multiple sounding reference signal resources in one sounding reference signal resource set associated with differing numbers of antenna ports, receive, from the base station, control signaling indicating a first mapping of a first number of one or more antenna ports to a first sounding reference signal resource of a set of multiple sounding reference signal resources of a sounding reference signal resource set, receive, from the base station, an uplink grant indicating a sounding reference signal resource index corresponding to the first sounding reference signal resource and indicating a precoding matrix indicator corresponding to a first number of transmit chains, and transmit, via the first sounding reference signal resource and in accordance with the precoding matrix indicator, a set of multiple sounding reference signals via the first number of one or more antenna ports using the first number of transmit chains.

In some examples of the method, apparatuses, and non-transitory computer-readable medium described herein, receiving the uplink grant may include operations, features, means, or instructions for receiving the uplink grant indicating that a power mode may be disabled and the precoding matrix indicator that indicates a vector including a number of non-zero coefficients corresponding to the first number of transmit chains.

In some examples of the method, apparatuses, and non-transitory computer-readable medium described herein, receiving the uplink grant may include operations, features, means, or instructions for receiving the uplink grant indicating that a power mode may be enabled and that the precoding matrix indicator indicates a vector including a number of non-zero coefficients that may be fewer than the first number of transmit chains.

In some examples of the method, apparatuses, and non-transitory computer-readable medium described herein, multiple transmit chains of the first number of transmit chains transmit multiple sounding reference signals of the set of multiple sounding reference signals via a same antenna port of the first number of one or more antenna ports.

Some examples of the method, apparatuses, and non-transitory computer-readable medium described herein may further include operations, features, means, or instructions for receiving, from the base station, control signaling indicating a first mapping of the first number of transmit chains to a first set of precoding matrix indicators including the precoding matrix indicator, and a second mapping of a second number of transmit chains to a second set of precoding matrix indicators.

Some examples of the method, apparatuses, and non-transitory computer-readable medium described herein may further include operations, features, means, or instructions for selecting, based on the precoding matrix indicator, the first number of transmit chains from a set of candidate numbers of transmit chains.

A method for wireless communications at a base station is described. The method may include receiving, from a UE, a message indicating that the UE is capable of supporting multiple sounding reference signal resources in one sounding reference signal resource set associated with differing numbers of antenna ports, transmitting, to the UE, control signaling indicating a first mapping of a first number of one or more antenna ports to a first sounding reference signal resource of a set of multiple sounding reference signal resources of a sounding reference signal resource set, transmitting, to the UE, an uplink grant indicating a sounding reference signal resource index corresponding to the first sounding reference signal resource and indicating a precoding matrix indicator corresponding to a first number of transmit chains, and receiving, via the first sounding reference signal resource and in accordance with the precoding matrix indicator, a set of multiple sounding reference signals via the first number of one or more antenna ports using the first number of transmit chains.

An apparatus for wireless communications at a base station is described. The apparatus may include a processor, memory coupled with the processor, and instructions stored in the memory. The instructions may be executable by the processor to cause the apparatus to receive, from a UE, a message indicating that the UE is capable of supporting multiple sounding reference signal resources in one sounding reference signal resource set associated with differing numbers of antenna ports, transmit, to the UE, control signaling indicating a first mapping of a first number of one or more antenna ports to a first sounding reference signal resource of a set of multiple sounding reference signal resources of a sounding reference signal resource set, transmit, to the UE, an uplink grant indicating a sounding reference signal resource index corresponding to the first sounding reference signal resource and indicating a precoding matrix indicator corresponding to a first number of transmit chains, and receive, via the first sounding reference signal resource and in accordance with the precoding matrix indicator, a set of multiple sounding reference signals via the first number of one or more antenna ports using the first number of transmit chains.

Another apparatus for wireless communications at a base station is described. The apparatus may include means for receiving, from a UE, a message indicating that the UE is capable of supporting multiple sounding reference signal resources in one sounding reference signal resource set associated with differing numbers of antenna ports, means for transmitting, to the UE, control signaling indicating a first mapping of a first number of one or more antenna ports to a first sounding reference signal resource of a set of multiple sounding reference signal resources of a sounding reference signal resource set, means for transmitting, to the UE, an uplink grant indicating a sounding reference signal resource index corresponding to the first sounding reference signal resource and indicating a precoding matrix indicator corresponding to a first number of transmit chains, and means for receiving, via the first sounding reference signal resource and in accordance with the precoding matrix indicator, a set of multiple sounding reference signals via the first number of one or more antenna ports using the first number of transmit chains.

A non-transitory computer-readable medium storing code for wireless communications at a base station is described. The code may include instructions executable by a processor to receive, from a UE, a message indicating that the UE is capable of supporting multiple sounding reference signal resources in one sounding reference signal resource set associated with differing numbers of antenna ports, transmit, to the UE, control signaling indicating a first mapping of a first number of one or more antenna ports to a first sounding reference signal resource of a set of multiple sounding reference signal resources of a sounding reference signal resource set, transmit, to the UE, an uplink grant indicating a sounding reference signal resource index corresponding to the first sounding reference signal resource and indicating a precoding matrix indicator corresponding to a first number of transmit chains, and receive, via the first sounding reference signal resource and in accordance with the precoding matrix indicator, a set of multiple sounding reference signals via the first number of one or more antenna ports using the first number of transmit chains.

In some examples of the method, apparatuses, and non-transitory computer-readable medium described herein, transmitting the uplink grant may include operations, features, means, or instructions for transmitting the uplink grant indicating that a power mode may be disabled and the precoding matrix indicator that indicates a vector including a number of non-zero coefficients corresponding to the first number of transmit chains.

In some examples of the method, apparatuses, and non-transitory computer-readable medium described herein, transmitting the uplink grant may include operations, features, means, or instructions for transmitting the uplink grant indicating that a power mode may be enabled and that the precoding matrix indicator indicates a vector including a number of non-zero coefficients that may be fewer than the first number of transmit chains.

In some examples of the method, apparatuses, and non-transitory computer-readable medium described herein, multiple transmit chains of the first number of transmit chains transmit multiple sounding reference signals of the set of multiple sounding reference signals via a same antenna port of the first number of one or more antenna ports.

Some examples of the method, apparatuses, and non-transitory computer-readable medium described herein may further include operations, features, means, or instructions for transmitting, to the UE, control signaling indicating a first mapping of the first number of transmit chains to a first set of precoding matrix indicators including the precoding matrix indicator, and a second mapping of a second number of transmit chains to a second set of precoding matrix indicators.

BRIEF DESCRIPTION OF THE DRAWINGS

FIGS. 3A and 3B illustrate examples of transmit chain switching schemes that supports codebook-based sounding reference signal and precoding matrix indicator configurations in accordance with aspects of the present disclosure.

DETAILED DESCRIPTION

Figure 1:
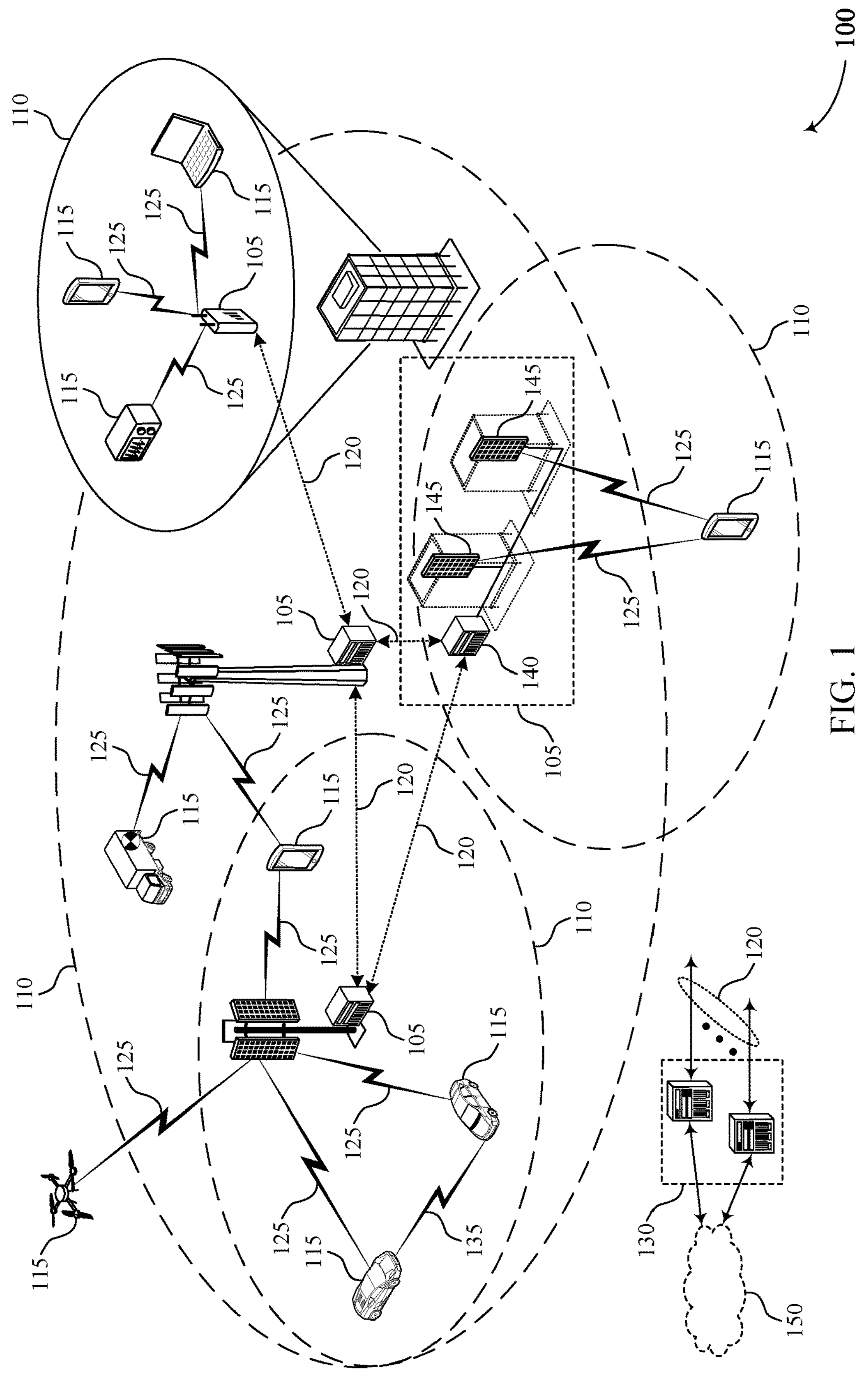
FIG. 1 illustrates an example of a wireless communications system that supports codebook-based sounding reference signal and precoding matrix indicator configurations in accordance with aspects of the present disclosure.

In some examples, a wireless communications system may support at most two radio frequency (RF) transmitters (e.g., transmit chains) for some ranges of frequency resources (e.g., below 6 GHz). If a UE supports transmit chain switching, then it may be able to support MIMO transmissions (e.g., massive MIMO), where an operating signal to noise ratio (SNR) for uplink MIMO at a base station may be decreased. Additionally, or alternatively, transmit chain switching for transmission of SRS may result in improved downlink MIMO performance. In some examples, two transmit chains may be used to realize a higher output power with low low-cost power amplifiers. Thus, by supporting multiple transmit chains on a single component carrier or multiple component carriers, UE performance, throughput, and power output may be improved, and interference may be decreased. However, if the number of supported transmit chains (e.g., for a particular SRS resource) is increased to a high number (e.g., four transmit chains), the UE may experience increased thermal cost.

Techniques described herein may include supporting three transmit chains for uplink signaling. Supporting three transmit chains may allow for various benefits (e.g., increased throughput, decreased interference, increased power output, etc.) without the associated thermal cost of higher numbers of transmit chains (e.g., four transmit chains).

In some examples, a UE may support a first number of transmit chains (e.g., two transmit chains) on a first carrier (CC), and a second number of transmit chains (e.g., three transmit chains, but not two transmit chains) on a second carrier. In such examples, the base station may configure codebook based SRS configurations for two transmit chains on the first carrier, and codebook based SRS configurations for three transmit chains on the second carrier. Additionally, or alternatively, the base station may configure the UE with a precoding matrix indicator (PMI) table for three transmit chains that is different than a PMI table for two transmit chains. For transmissions on the second carrier (e.g., using three transmit chains), the base station may indicate (e.g., in a downlink control information (DCI) message) a PMI from the PMI table for three transmit chains.

In some examples, the UE may support either two transmit chains or three transmit chains on the second carrier. In such examples, the base station may configure different SRS resources for different numbers of transmit chains. For instance, SRS resource configured with two ports may indicate two transmit chains, and SRS resource configured with three ports may indicate three transmit chains. In some examples, different SRS resources may be configured for two transmit chains, and other SRS resources may be configured for three transmit chains (e.g., in a same SRS resource or in two different SRS resource sets). In such examples, the base station may indicate (e.g., via DCI signaling) an index associated with an SRS resource, and the UE may select (e.g., based on a configured mapping between the SRS resource index and a number of SRS ports and a number of transmit chains), a corresponding SRS resource, number of ports, number of transmit chains, or any combination thereof.

In some examples, the UE may support either two transmit chains or three transmit chains on the second carrier, and the base station may indicate a number of transmit chains for a given SRS resource based on a PMI index. For example, the base station may configure one or more SRS resources (e.g., in one or more SRS resource sets), and may configure each SRS resource with a number of ports (e.g., one port, two ports, or three ports). The base station may indicate (e.g., via DCI signaling), an SRS resource index and a PMI index for transmitting SRSs. The PMI index may indicate whether the UE is to use two transmit chains or three transmit chains for transmitting SRSs on the indexed SRS resource (e.g., if each value of a last row in the matrix of the PMI is set to zero, then the UE may use two transmit chains, and may otherwise use three transmit chains).

Aspects of the disclosure are initially described in the context of wireless communications systems. Aspects of the disclosure are further illustrated by and described with reference to wireless communications systems, transmit chain switching schemes, process flows, and SRS resource configurations. Aspects of the disclosure are further illustrated by and described with reference to apparatus diagrams, system diagrams, and flowcharts that relate to codebook-based sounding reference signal and precoding matrix indicator configurations.

FIG. 1 illustrates an example of a wireless communications system 100 that supports codebook-based sounding reference signal and precoding matrix indicator configurations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, as described herein with reference to FIGS. 2-11, a UE 115 may support a first number of transmit chains (e.g., two transmit chains) on a first carrier (CC), and a second number of transmit chains (e.g., three transmit chains, but not two transmit chains) on a second carrier. In such examples, a base station 105 may configure codebook based SRS configurations for two transmit chains on the first carrier, and codebook based SRS configurations for three transmit chains on the second carrier. Additionally, or alternatively, the base station 105 may configure the UE 115 with a precoding matrix indicator (PMI) table for three transmit chains that is different than a PMI table for two transmit chains. For transmissions on the second carrier (e.g., using three transmit chains), the base station 105 may indicate (e.g., in a downlink control information (DCI) message) a PMI from the PMI table for three transmit chains.

In some examples, the UE 115 may support either two transmit chains or three transmit chains on the second carrier. In such examples, the base station 105 may configure different SRS resources for different numbers of transmit chains. For instance, SRS resource configured with two ports may indicate two transmit chains, and SRS resource configured with three ports may indicate three transmit chains. In some examples, different SRS resources may be configured for two transmit chains, and other SRS resources may be configured for three transmit chains (e.g., in a same SRS resource or in two different SRS resource sets). In such examples, the base station 105 may indicate (e.g., via DCI signaling) an index associated with an SRS resource, and the UE 115 may select (e.g., based on a configured mapping between the SRS resource index and a number of SRS ports and a number of transmit chains), a corresponding SRS resource, number of ports, number of transmit chains, or any combination thereof.

In some examples, the UE 115 may support either two transmit chains or three transmit chains on the second carrier, and the base station may indicate a number of transmit chains for a given SRS resource based on a PMI index. For example, the base station 105 may configure one or more SRS resources (e.g., in one or more SRS resource sets), and may configure each SRS resource with a number of ports (e.g., one port, two ports, or three ports). The base station 105 may indicate (e.g., via DCI signaling), an SRS resource index and a PMI index for transmitting SRSs. The PMI index may indicate whether the UE 115 is to use two transmit chains or three transmit chains for transmitting SRSs on the indexed SRS resource (e.g., if each value of a last row in the matrix of the PMI is set to zero, then the UE 115 may use two transmit chains, and may otherwise use three transmit chains).

Figure 2:
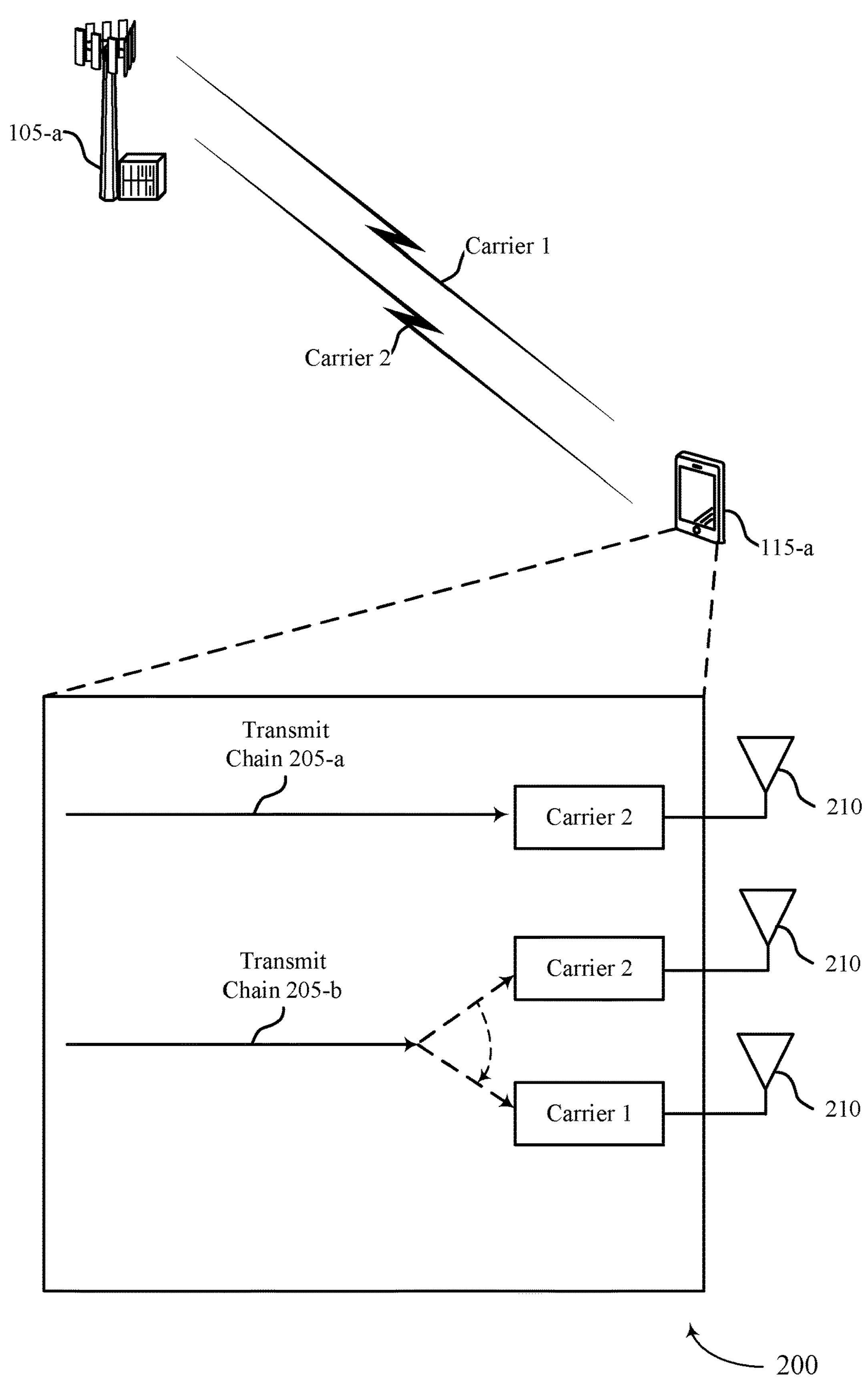
FIG. 2 illustrates an example of a wireless communications system that supports codebook-based sounding reference signal and precoding matrix indicator configurations in accordance with aspects of the present disclosure.

FIG. 2 illustrates an example of a wireless communications system 200 that supports codebook-based sounding reference signal and precoding matrix indicator configurations in accordance with aspects of the present disclosure. Wireless communications system 200 may include a base station 105-*a* and a UE 115-*a*, which may be examples of corresponding devices described with reference to FIG. 1.

The base station 105-*a* and the UE 115-*a* may communicate with each other via one or more carriers (e.g., carrier 1 and carrier 2). In some examples, the UE 115-*a* may support one or more transmit chains 205. In some examples, a transmit chain may include one or more digital precoders (DPs) (e.g., to digitally precode and transfer one or more data layers to one or more antennas 210. The transmit chains 205 may include one or more digital to analog conversion (DAC) components, a splitter (e.g., a radio frequency (RF) splitter), one or more analog phase shifters (e.g., to steer the precoded signal to a direction for the beam), and one or more power amplifiers (PAs) to amplify the signal power and output power $P_{out}$.

The UE 115-*a* may perform transmit chain switching (e.g., from carrier 1 to carrier 2). For instance, carrier 2 may be a 3.5 GHz carrier, and carrier 1 may be a 2.1 GHz carrier. UE 15-*a* may switch transmit chain 205-*b* between carrier 1 and carrier 2, resulting in the capability to support multi-antenna (e.g., two-antenna) transmissions on carrier 2. The UE 115-*a* may benefit from performing two-antenna transmissions (e.g., over one-antenna transmissions) for some bandwidths (e.g., higher bandwidths in time division duplexing (TDD) bands). For instance, when performing massive MIMO transmissions (e.g., with 16, 32, or 64 receiver antenna ports at base station 105-*a*), an operating SNR level for uplink two-layer MIMO may be significantly decreased when the UE 115-*a* supports two-antenna transmissions (e.g., on carrier 2). In some examples, communications via two transmit streams and four receive streams (e.g., 2T4R implementations) at the UE 115-*a* may be preferred (e.g., instead of one transmit stream and four receive streams (e.g., 1T4R implementations) at the UE 115-*a*, because SRS antenna switching may improve downlink MIMO performance. In some examples, using two transmit chains 2-5 may be used to realize high output power (e.g., 26 dBm) with two low-cost power amplifiers (PAs) (e.g., 23 dBm).

In some examples, a transmit chain (e.g., transmit chain 205-*b*) may be used for lower frequency bands (e.g., 2.1 GHz) in an FDD configuration to enhance coverage. To realize one transmit chain (e.g., transmit chain 205-*b*) on FDD carrier 2 and two transmit chains on TDD carrier 2 in a multi-carrier deployment, the UE 115-*a* may share transmit chain 205-*b* across carrier 1 and carrier 1.

In some examples, the UE 115-*a* and the base station 105-*a* may communicate over aggregated bands with different frequencies (e.g., 3.5 GHz and 2.1 GHz). To enable uplink MIMO in a band for the UE 115-*a* with a total of two transmit chains 205, the UE 115-*a* may use the feature of transmit chain switching (e.g., switching transmit chain 205-*b* between carrier 1 and carrier 2). UE 115-*a* may support switching between different cases. For instance, in a first case (e.g., case 1), the UE 115-*a* may support one transmit chain on carrier 2 and one transmit chain on carrier 1. In a second case (e.g., case 2), the UE 115-*a* may support zero transmit chains on carrier 1 and two transmit chains on carrier 2. The UE 115-*a* may switch between case 1 and case 2 for various scenarios, which may include inter-band uplink carrier aggregation, supplemental uplink (SUL) (e.g., without E-UTRAN new radio dual connectivity (EN-DC)), inter-band EN-DC without SUL, or the like.

In some examples, as described herein, two transmit chains may be used to realize a higher output power with two low-cost power amplifiers. Thus, by supporting multiple transmit chains on a single component carrier or multiple component carriers, UE performance, throughput, and power output may be improved, and interference may be decreased. However, if the number of supported transmit chains (e.g., for a particular SRS resource) is increased to a high number (e.g., four transmit chains), the UE may experience increased thermal cost.

Techniques described herein may include supporting up to three transmit chains for uplink signaling. Supporting three transmit chains may allow for various benefits (e.g., increased throughput, decreased interference, increased power output, etc.), without the associated thermal cost of higher numbers of transmit chains (e.g., four transmit chains).

FIG. 3A and FIG. 3B illustrate examples of transmit chain switching schemes 300 and 301, respectively. The transmit chain switching schemes may be implemented by one or more wireless devices, such as a UE 115 and a base station 105, which may be examples of corresponding devices described with reference to FIGS. 1 and 2. A UE may communicate with a base station according to a TDD deployment, in which transmission time intervals (TTIs) (e.g., slots, mini-slots, frames, subframes, or the like), are designated as uplink (U), downlink (D), or special (S) (e.g., flexible).

Techniques described herein may be applicable to any or all uplink channels and signals (e.g., physical uplink shared channels (PUSCHs), physical uplink control channels (PUCCHs), SRSs, or the like). Uplink transmit chain switching may be performed in a carrier aggregation configuration (e.g., with UE capability signaling), as described herein. In some examples, as illustrated with reference to transmit chain switching scheme 300 (e.g., in a first option, which may be referred to as option 1), the UE may not support simultaneous transmission on two CCs. In such examples, the UE may support numbers of transmit chains and antenna ports for uplink transmissions as illustrated with reference to table 1:

TABLE 1

| | Number of Transmit Chains in Wireless Information Devices (WID) (Carrier 1 + Carrier 2) | Number of Antenna Ports for Uplink Transmissions (Carrier 1 + Carrier 2) |
|---|---|---|
| Case 1 | 1T + 1T | 1P + 0P |
| Case 2 | 0T + 2T | 0P + 2P, 0P + 1P |

Thus, as described with reference to FIG. 3A, the UE may communicate uplink signaling during slot 0 and slot 1 on carrier 1 using one or two transmit chains and up to two antenna ports in a TDD configuration with full rank, or an FDD configuration (but may refrain from transmitting uplink signaling during slot 3 on carrier 2, because simultaneous transmission is not supported). During slot 4 on carrier 2 (e.g., the first portion of slot 2 on carrier 1), the UE may transmit uplink signaling on carrier 2 using one transmit chain. During the second portion of slot 2 of carrier 1, the UE may transmit uplink signaling using up to two using one or two transmit chains and up to two antenna ports in a TDD configuration with full rank, or an FDD configuration.

In some examples, as illustrated with reference to transmit chain switching scheme 301 (e.g., in a second option, which may be referred to as option 2), the UE may support simultaneous transmission on two CCs. In such examples, the UE may support numbers of transmit chains and antenna ports for uplink transmissions as illustrated with reference to table 2:

TABLE 2

| | Number of Transmit Chains in Wireless Information Devices (WID) (Carrier 1 + Carrier 2) | Number of Antenna Ports for Uplink Transmissions (Carrier 1 + Carrier 2) |
|---|---|---|
| Case 1 | 1T + 1T | 1P + 0P, 1P + 1P, 0P + 1P |
| Case 2 | 0T + 2T | 0P + 2P, 0P + 1P |

Thus, as described with reference to FIG. 3B, the UE may communicate uplink signaling during slot 0 and slot 1 on carrier 1 using one or two transmit chains and up to one antenna port in a TDD configuration with full rank, or an FDD configuration During slot 4 on carrier 2 (e.g., the first portion of slot 2 on carrier 1), the UE may transmit uplink signaling on carrier 2 using one transmit chain, and may transmit uplink signaling on carrier 1 using one transmit chain. During the second portion of slot 2 of carrier 1, the UE may continue to transmit uplink signaling using one or two transmit chains and one antenna port in a TDD configuration with full rank, or an FDD configuration.

In some examples, as described in greater detail with reference to FIGS. 4-10, the UE may perform similar transmit chain switching using a larger number of transmit chains (e.g., 3 or more). For example, some UEs (e.g., legacy UEs) may support up to two radio frequency transmitters (e.g., transmit chains) for some frequencies (e.g., below 6 GHz). The UE may benefit from an increased number of transmit chains (e.g., improved throughput, increased flexibility, decreased system latency, improved use experience, or the like). However, using too many transmit chains (e.g., four transmit chains) may result in increased thermal cost at the UE. In some examples, a number of transmit chains that is greater than two, but less than a number of transmit chains that results in too much thermal cost (e.g., 4) may increase throughput without the signaling degradation resulting from thermal increases. In such examples, as described herein, the UE may utilize three transmit chains, and may switch one or more transmit chains across multiple carriers, as described in greater detail with reference to FIG. 4.

Figure 4:
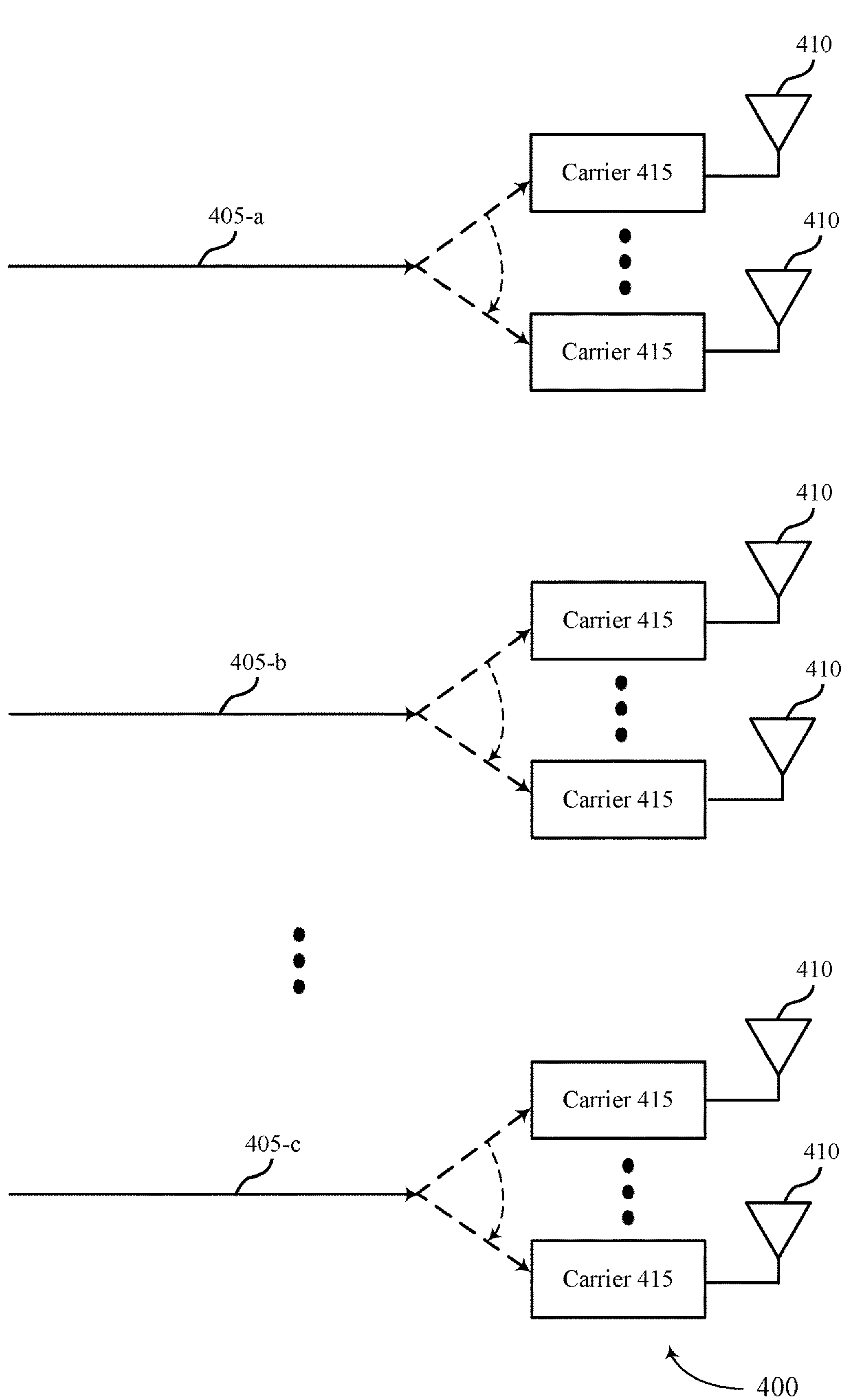
FIG. 4 illustrates an example of a transmit chain switching scheme that supports codebook-based sounding reference signal and precoding matrix indicator configurations in accordance with aspects of the present disclosure.

FIG. 4 illustrates an example of a transmit chain switching scheme 400 that supports codebook-based sounding reference signal and precoding matrix indicator configurations in accordance with aspects of the present disclosure. Transmit chain switching scheme 400 may be implemented by one or more wireless devices, such as a UE and a base station, which may be examples of corresponding devices described with reference to FIGS. 1-3. The UE may generate and transmit uplink signaling using transmit chains 405 on carriers 415 via antennas 410.

In some examples, the UE may support transmit chain switching scheme 400 for a number of M transmit chains 405. Each transmit chain 405 (e.g., of the M transmit chains 405) may switch among a number of N carriers. The CC set for each transmit chain may be the same or different. For instance, a CC set of NiCCs for transmit chain 405-*a* may range from CC X to CC X+$N_1$−1, a CC set of $N_2$ CCs for transmit chain 405-*b* may range from CC Y to CC Y+$N_2$−1, a CC set of $N_3$ CCs for transmit chain 405-*c* may range from CC Z to CC Z+$N_3$−1. For a specific CC in a specific slot, by using transmit chain switching, the UE may implement uplink MIMO schemes with more than one transmit chain. This structure may be generally applied for uplink transmission switching or EN-DC, CA, SUL strategies, or the like. Although techniques described herein with reference to transmit chain switching may refer to an example of three transmit chains, techniques described may be applicable for any number of transmit chains 405 and any number of carriers for each transmit chains 405.

Figure 5:
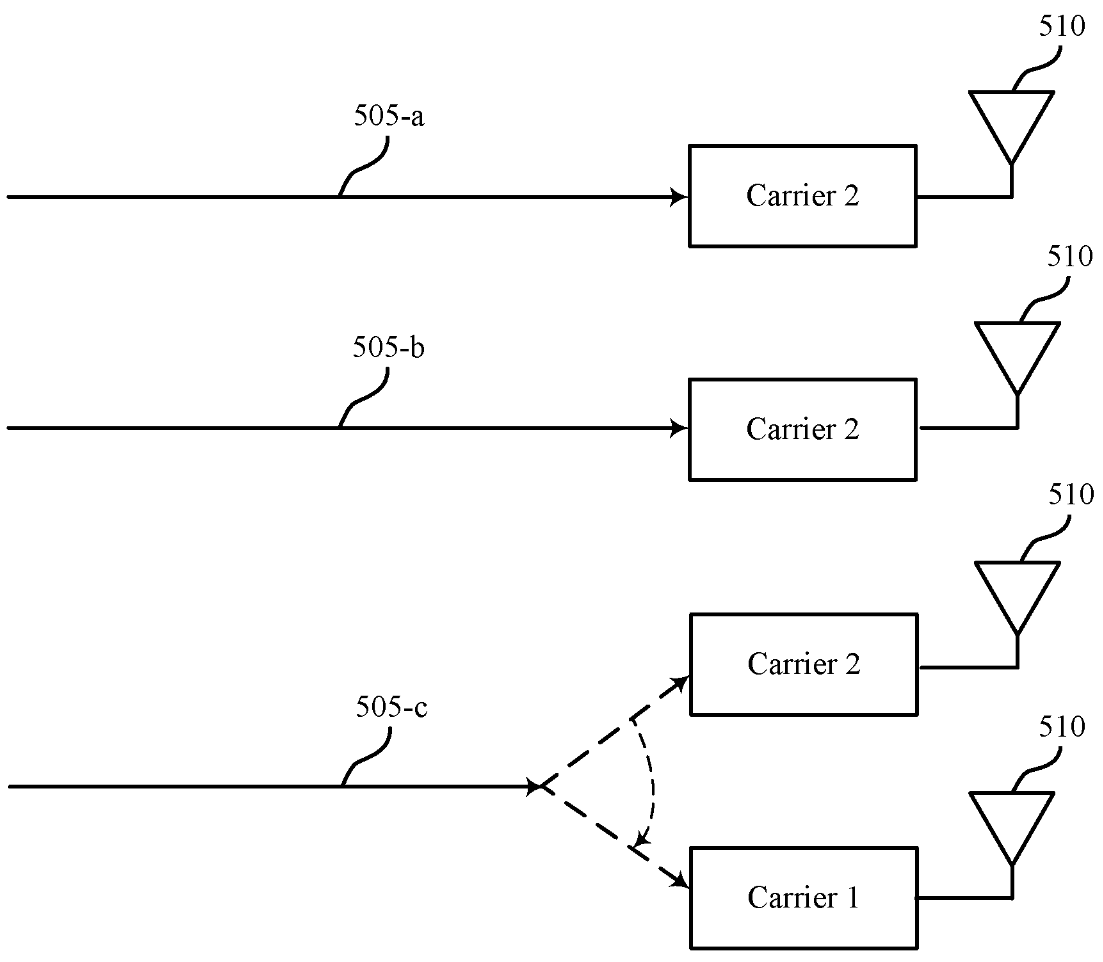
FIG. 5 illustrates an example of a transmit chain switching scheme that supports codebook-based sounding reference signal and precoding matrix indicator configurations in accordance with aspects of the present disclosure.

FIG. 5 illustrates an example of a transmit switching scheme 500 that supports codebook-based sounding reference signal and precoding matrix indicator configurations in accordance with aspects of the present disclosure. Transmit chain switching scheme 500 may be implemented by one or more wireless device, such as a UE and a base station, which may be examples of corresponding devices described with reference to FIGS. 1-4. In some examples, techniques described with reference to FIG. 5 may be implanted for any number of transmit chains 505, or any number of carriers, as described in greater detail with reference to FIG. 4. The UE may perform uplink transmission by using one or more transmit chains 505 to generate transmissions using antennas 510 on one or more carriers.

In some examples, the ULE may support a number of transmit chains 505. For example, the UE may support transmit chain 505-*a*, transmit chain 505-*b*, and transmit chain 505-*c*. The UE may communicate using the transmit chains 505 over multiple carriers (e.g., carrier 1 and carrier 2). In some examples, carrier 1 may be a lower frequency carrier (e.g., 2.1 GHz), and may be configured for FDD transmissions. In some examples, carrier 2 may be a higher frequency carrier (e.g., 0.3.5 GHz), and may be configured for TDD transmissions.

Uplink switching as described herein may be applicable to all uplink channels and signals (e.g., PUSCHs, PUCCHs, SRSs, and the like). By switching transmit chains across carriers, the UE may support different transmission configurations. For example, in a first case, the UE may use one transmit chain on carrier 1 (e.g., transmit chain 505-*c* on carrier 1), and two transmit chains on carrier 2 (e.g., transmit chain 505-*a* and transmit chain 505-*b*). In a second case (e.g., if the UE switches the transmit chain 505-*c* from carrier 1 to carrier 2), the UE may use zero transmit chains on carrier 1, and may use three transmit chains (e.g., transmit chain 505-*a*, transmit chain 505-*b*, and transmit chain 505-*c*) on carrier 2. For uplink CA scenarios (e.g., with three transmit chain switching), techniques described herein may support codebook based PUSCH transmissions, because transmissions using two transmit chains and transmissions using three transmit chains on carrier 2 may be dynamically scheduled (e.g., via DCI signaling).

In some examples, three transmit chains may be supported for carrier 2, but transmissions using two transmit chains may not be supported on carrier 2. In such examples, the UE may perform codebook based SRS configurations on carrier 2. For example, the base station may configure one or more SRS resources on carrier 2. The UE may determine (e.g., based on one or more rules) that all SRS transmissions on the carrier 2 may be performed using transmit chain 505-*a*, transmit chain 505-*b*, and transmit chain 505-*c*. The base station may indicate, to the UE (e.g., via control signaling), the one or more rules for carrier 2. In some examples, the one or more rules (e.g., indicating that three transmit chains and not two transmit chains are supported on carrier 2) may be preconfigured, or indicated in one or more standards. In some examples, the base station may configure a TPMI table for three transmit chains on carrier 2. The UE may select a TPMI from the TPMI table for three transmit chains (e.g., upon receiving a DCI triggering SRS transmissions, or the like). Similar procedures may be performed for any uplink transmission or channel. Techniques for operations when only transmit chains (e.g., but not two transmit chains) are allowed to be transmitted on carrier 2 are described in greater detail with reference to FIG. 6.

In some examples, transmissions using either two transmit chains or three transmit chains may be supported on carrier 2. In such examples, the base station may configure at least two SRS resources (e.g., one with two ports and one with three ports). The UE may determine whether to use two transmit chains or three transmit chains based on a received SRS resource indicator (SRI) indicating one of the configured SRS resources. For instance, the base station may configure the UE with a mapping of SRS indices, transmit chains, antenna ports, or any combination thereof. The base station may include, in the DCI that triggers SRS transmission, an index associated with a number of transmit chains. The index (e.g., an SRI) may indicate a particular number of transmit chains, which the UE may use to transmit SRSs on the indicated SRS resource using the corresponding number of transmit chains. In some examples, if the SRI indicates an SRS resource configured with two ports, then the UE may use two transmit chains (e.g., one transmit chain for each port). If the SRI indicates an SRS resource configured with three ports, then the UE may use three transmit chains (e.g., one transmit chain for each port). Additionally, or alternatively, different numbers of transmit chains may be associated with different TPMI tables. Such techniques are described in greater detail with reference to FIGS. 7-9

In some examples, when transmissions using either two transmit chains or three transmit chains may be supported on carrier 2, the base station may configure SRS resources and a single TPMI table. In such examples, different TPMI indices may distinguish between two transmit chains or three transmit chains (e.g., whether the UE should use two transmit chains or three transmit chains for transmitting SRSs on a given SRS resource). Such techniques are described in greater detail with reference to FIGS. 10-11.

Figure 6:
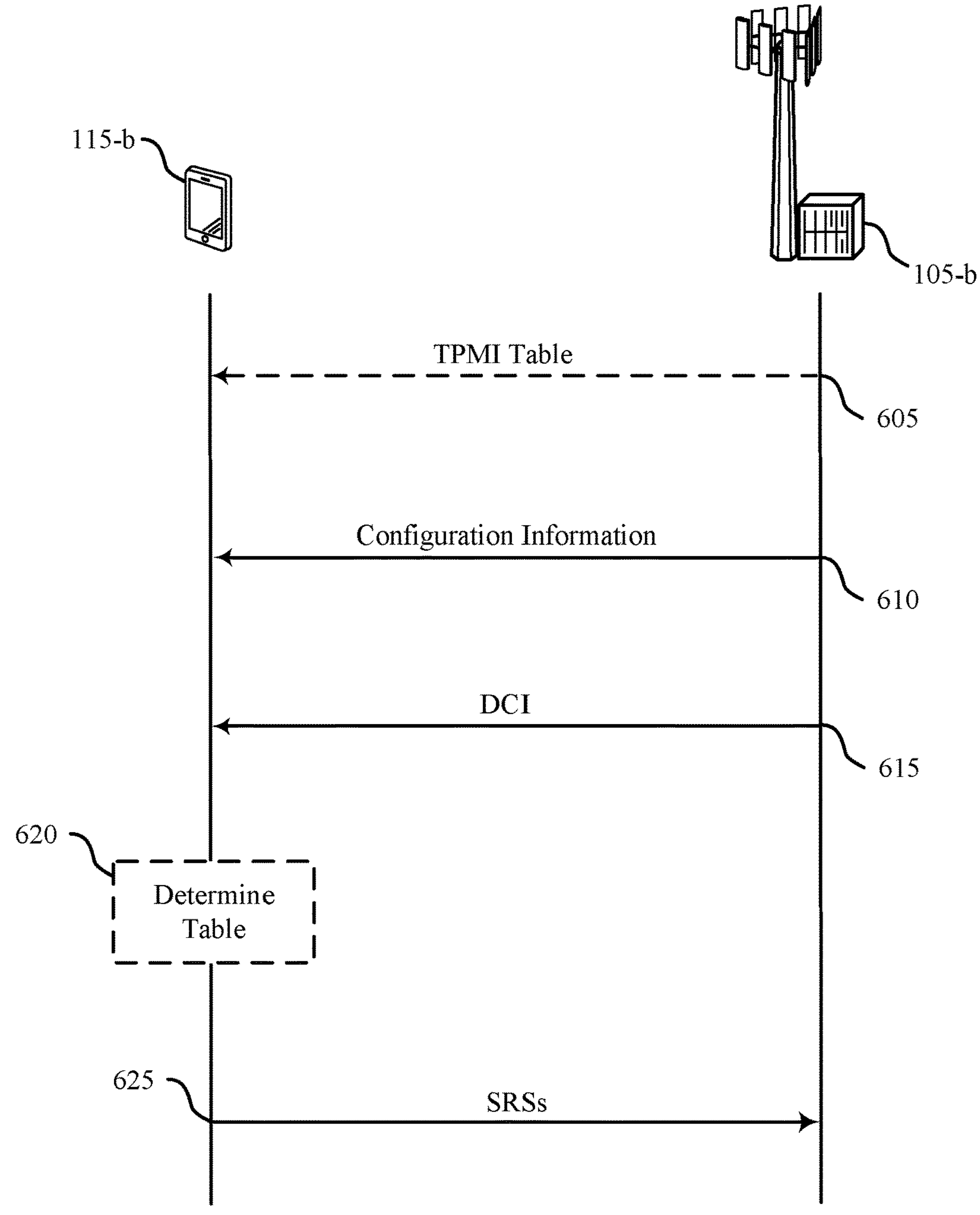
FIG. 6 illustrates an example of a process flow that supports codebook-based sounding reference signal and precoding matrix indicator configurations in accordance with aspects of the present disclosure.

FIG. 6 illustrates an example of a process flow 600 that supports codebook-based sounding reference signal and precoding matrix indicator configurations in accordance with aspects of the present disclosure. In some examples, process flow 600 may include a UE 115-*b*, and a base station 105-*b*, which may be examples of corresponding devices described with reference to FIGS. 1-5. In some examples, as described with reference to FIG. 5, the UE 115-*b* may support multiple transmit chains (e.g., three transmit chains). In some examples, three transmit chains may be supported for transmissions on carrier 2, while two transmit chains may not be supported for transmissions on carrier 2.

At 610, the base station 105-*b* may transmit configuration information to the UE 115-*b*. The base station 105-*b* may configure the UE 115-*b* with one or more SRS resources for transmitting SRSs at 115-*b*. The base station may configure at least one SRS resource (e.g., on carrier 2) with three ports. In some examples, the configuration information may be RRC signaling, and may include one or more RRC parameters (e.g., nrofSRS-Port) indicating a number of ports for a given SRS resource. In some examples, such an RRC parameter may indicate three antenna ports for a configured SRS resource.

At 615, the base station 105-*b* may transmit, and the UE 115-*b* may receive, a DCI message. The DCI message may include an index (e.g., an SRI) indicating an SRS resource. The SRI may indicate the SRS resource configured with three ports.

At 625, the UE 115-*b* may transmit one or more SRSs to the base station 105-*b*. The UE 115-*b* may transmit the SRSs on the SRS resource configured with three ports at 610, and triggered by the SRI in the DCI message at 615. The UE may transmit the SRSs on carrier 2, using three transmit chains.

In some examples, at 605, the base station 105-*b* may transmit, to the UE 115-*b*, an indication of one or more TPMI tables. One of the TPMI tables may include one or more TPMIs for transmissions using three transmit chains. In some examples, the DCI may include an index for the TPMI table for three transmit chains. The UE may determine the table to use for selecting the TPMI at 620. The UE 115-*b* may receive, for example via RRC signaling at 610 (e.g., an RRC parameter such as PUSCH-Config) an indication of a transform precoder, a maximum rank, a codebook subset, or any combination thereof. The UE may select the appropriate table, and may identify a TPMI for transmitting the SRSs at 625.

In some examples, as described in greater detail with reference to FIGS. 7-11, the UE may support both two transmit chains and three transmit chains on carrier 2.

Figure 7:
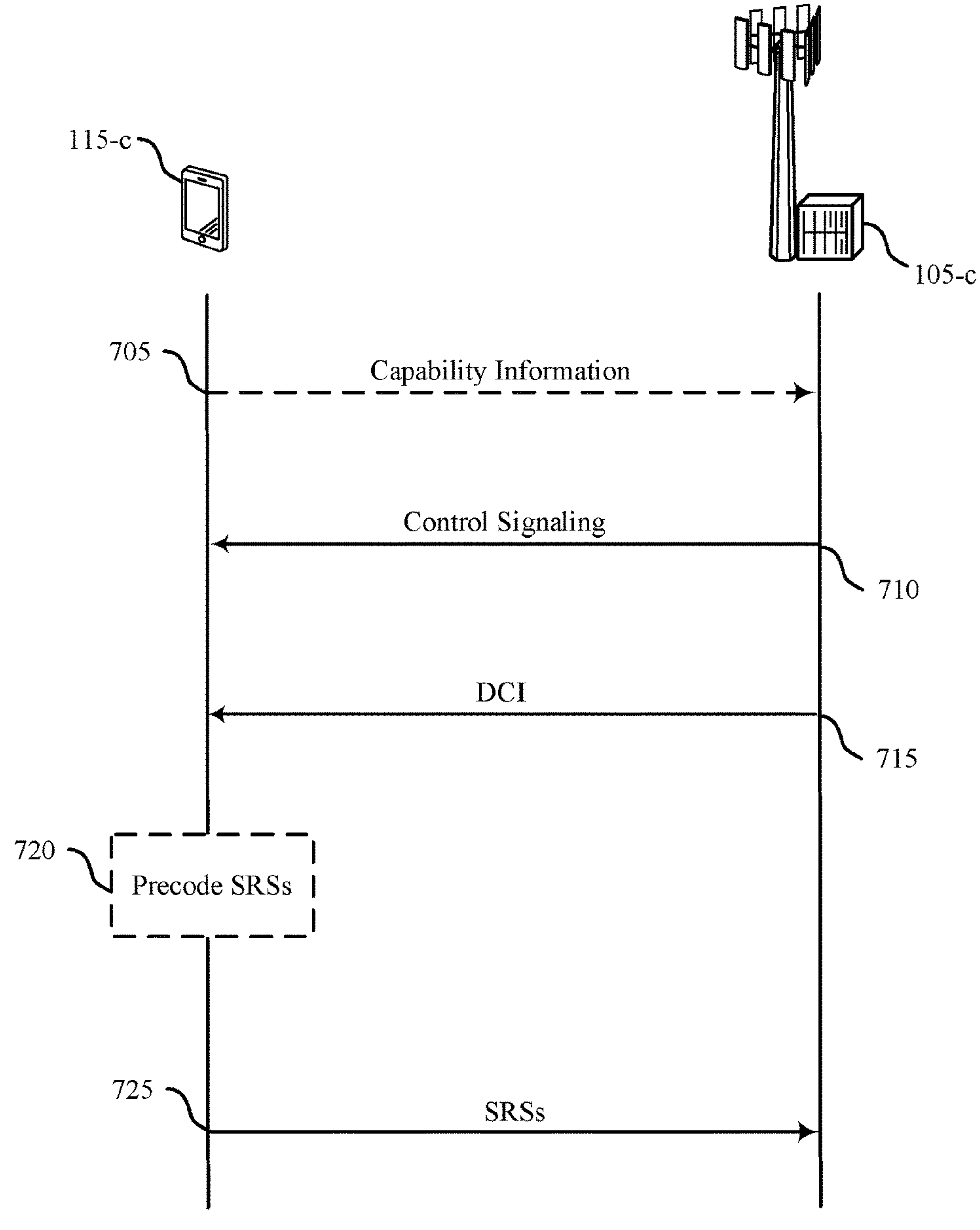
FIG. 7 illustrates an example of a process flow that supports codebook-based sounding reference signal and precoding matrix indicator configurations in accordance with aspects of the present disclosure.

FIG. 7 illustrates an example of a process flow 700 that supports codebook-based sounding reference signal and precoding matrix indicator configurations in accordance with aspects of the present disclosure. Process flow 700 may include a UE 115-*c*, and a base station 105-*c*, which may be examples of corresponding devices described with reference to FIGS. 1-6. In some examples, as described with reference to FIG. 5, the UE 115-*b* may support multiple transmit chains (e.g., three transmit chains). In some examples, three transmit chains or two transmit chains may be supported for transmissions on carrier 2.

In some examples, simultaneous transmission on the two carriers may not be supported. In such examples, the UE 115-*c* may support numbers of transmit chains and antenna ports for uplink transmissions as illustrated with reference to table 3:

TABLE 3

| | Number of Transmit Chains in Wireless Information Devices (WID) (Carrier 1 + Carrier 2) | Number of Antenna Ports for Uplink Transmissions (Carrier 1 + Carrier 2) |
|---|---|---|
| Case 1 | 1T + 1T | 1P + 0P |
| Case 2 | 0T + 3T | 0P + 3P, 0P + 2P, 0P + 1P |

In some examples, simultaneous transmission on two carriers may not be supported. In such examples, the UE 115-*c* may support numbers of transmit chins and antenna ports for uplink transmissions as illustrated with reference to table 4.

TABLE 4

| | Number of Transmit Chains in Wireless Information Devices (WID) (Carrier 1 + Carrier 2) | Number of Antenna Ports for Uplink Transmissions (Carrier 1 + Carrier 2) |
|---|---|---|
| Case 1 | 1T + 2T | 1P + 0P, 1P + 2P, 0P + 2P, 0P + 1P |
| Case 2 | 0T + 3T | 0P + 2P, 0P + 3P, 0P + 1P |

As described herein, in cases where both two transmit chains and three transmit chains are supported on carrier 2, the UE 115-*c* may support two ports and three ports for uplink transmissions. Such uplink transmissions may be indicated via a DCI message (e.g., a DCI format 01) for uplink carrier aggregation transmit chain switching (e.g., at 715).

At 705, the UE 115-*c* may transmit, and the base station 105-*c* may receive, capability information. The capability information may indicate that the UE 115-*c* is capable of supporting multiple SRS resources in an SRS resource set associated with differing numbers of antenna ports.

At 710, the base station 105-*c* may transmit, and the UE 115-*c* may receive, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set. In some examples, the base station 105-*d* may transmit the control signaling based at least in part on having received (e.g., responsive to) the capability information at 705.

In some examples, the base station 105-*c* may configure at least two SRS resources. At least one SRS resource may be configured for two-port uplink transmissions (e.g., a two-port SRS resource) and at least one SRS resource may be configured for three-port uplink transmissions (e.g., a three-port SRS resource). Each of the SRS resource may be configured for codebook-based transmissions on carrier two. In some examples, the two-port SRS resources may be used to indicate two transmit chains, and the three-port SRS resources may be used to indicate three transmit chains.

In some examples, the base station 105-*c* may configure different SRS resources in a single SRS resource set, or in multiple SRS resource sets. The different SRS resources may have the same number of ports or different numbers of ports. The UEs may virtualize different numbers of transmit chains to different numbers of ports based on the location of an indicated SRS resources in a particular SRS resource set, or based on index for the SRS resource in asset of indexes, or the like. Such procedures are described in greater detail with reference to FIGS. 8 and 9.

AT 715, the base station 105-*c* may transmit, and the UE 115-*c* may receive, an uplink grant (e.g., a DCI message) indicating an SRS resource index (e.g., an SRI) corresponding to an SRS resource. If the SRI indicates a two-port SRS resource, then the SRI may indicate that the UE 115-*c* is to use two transmit chains for transmitting the SRSs on the SRS resource indicated by the SRI. If the SRI indicates a three-port SRS resource, then the SRI may indicate that the UE 115-*c* is to use three transmit chains for transmitting the SRSs on the SRS resource indicated by the SRI.

In some examples, as described in greater detail with reference to FIGS. 8 and 9, the UE may determine whether to transmit using two transmit chains or three transmit chains based on the SRI indicating an SRS resource in a particular SRS resource set, or based on the SRI being one of an indexed set of SRIs for a single SRS resource set.

At 725, the UE 115-*c* may transmit one or more SRSs on the SRS resource indicated by the SRI. The UE 115-*c* may transmit the SRSs using a number of antenna ports and a number of transmit chains corresponding to the SRS resource according to the mapping received at 710.

In some examples, the base station may indicate, via DCI transmitted at 715, a TPMI for the UE 115-*c* to use for precoding and transmitting the SRSs. For example, the base station 105-*c* may indicate the number of transmit chains and the TPMI via the uplink grant included in the DCI message. The number of transmit chains may be implicitly indicated by the SRI, which may correspond to an SRS resource with different numbers of ports (e.g., two ports or three ports). The SRI may implicitly indicate two transmit chains to be used on carrier 2. In such examples, the UE may select a TPMI from a two-transmit chain TPMI table (e.g., configured via control signaling received at 710). The UE 115-*c* may then precode the SRSs at 720 and transmit the SRSs at 725 according to the two-transmit chain TPMI table and corresponding precoding matrices. If the SRI implicitly indicates three transmit chains to be used on carrier 2, then the UE may select a TPMI from a three-transmit chain TPMI table (e.g., configured via control signaling received at 710). The UE 115-*c* may then precode the SRSs at 720 and transmit the SRSs at 725 according to the three-transmit chain TPMI table and the corresponding precoding matrices.

In some examples, the UE 115-*c* may be configured with a power mode (e.g., full power mode 2). The power mode may indicate whether the UE 115-*c* is permitted to support multiple SRS resources configured with different numbers of ports in one SRS resource set. If the UE 115-*c* supports full power mode 2 configurations for cases where both two transmit chains and three transmit chains are permitted on a same carrier, then a rule may be defined to distinguish SRS resources with different transmit chains and different port virtualizations as described in greater detail with reference to FIGS. 8 and 9. In some examples, such rules may be configured by the base station 105-*c* (e.g., in control signaling received at 710). In some examples, such rules may be included in one or more standards documents, preconfigured at the UE 115-*c*, signaled to the UE 115-*c*, or the like.

Figure 8:
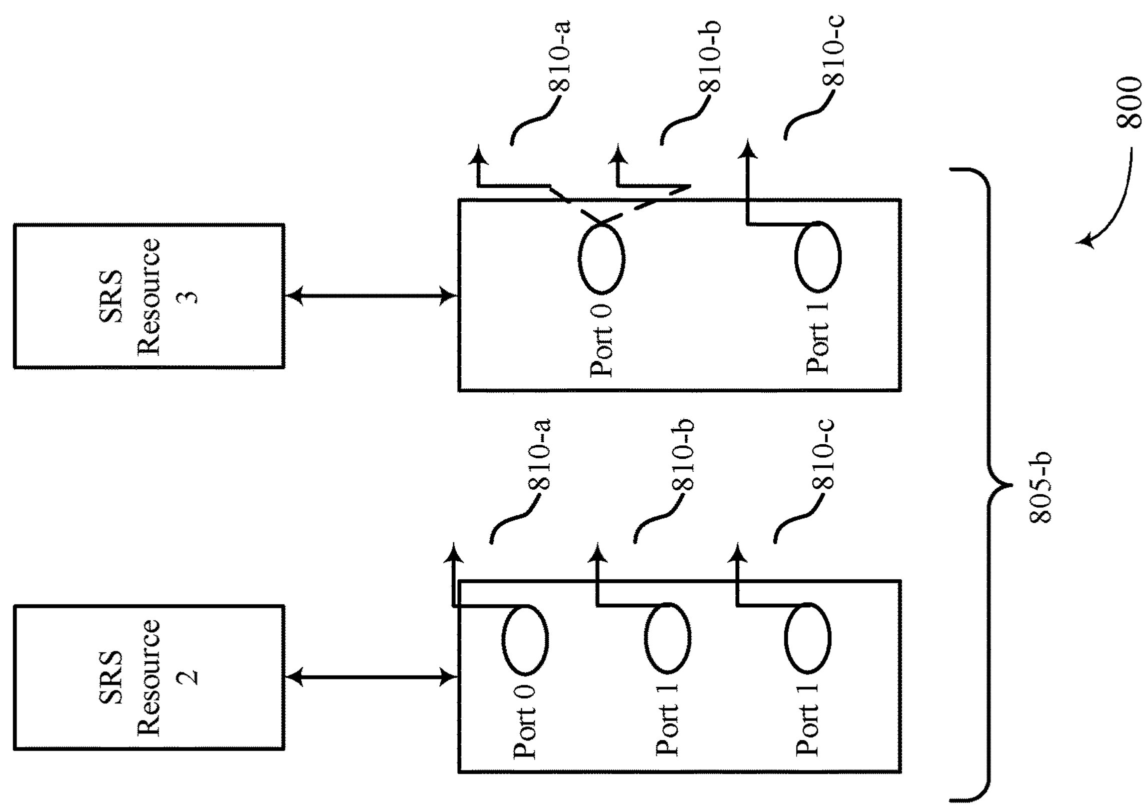
FIG. 8 illustrates an example of an SRS resource configuration that supports codebook-based sounding reference signal and precoding matrix indicator configurations in accordance with aspects of the present disclosure.
Figure 8:
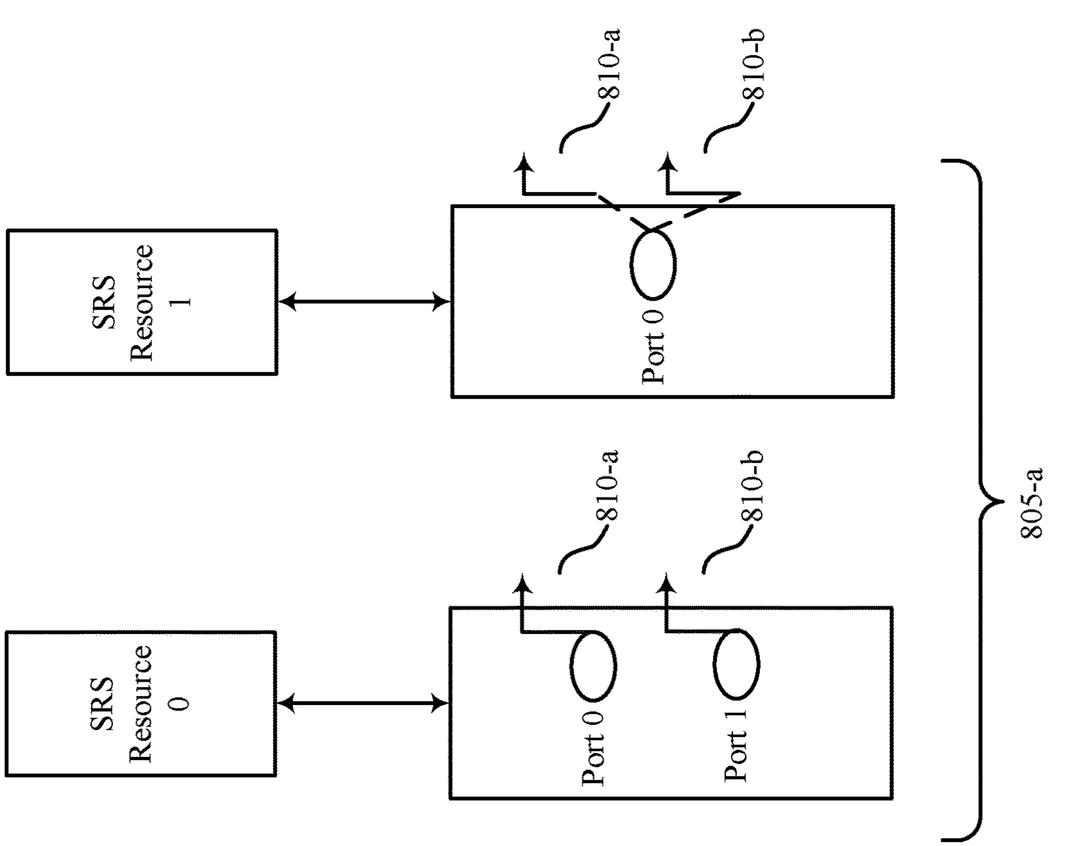

FIG. 8 illustrates an example of an SRS configuration 800 that supports codebook-based sounding reference signal and precoding matrix indicator configurations in accordance with aspects of the present disclosure. SRS configuration 800 may be configured and implemented by one or more wireless devices, such as UEs (e.g., UEs 115) and base stations (e.g., base stations 105) which may be examples of corresponding devices as described with reference to FIGS. 1-7.

In some examples, where full power mode 2 is configured for cases where the UE supports both two transmit chains and three transmit chains on carrier 2, a rule may be defined to distinguish SRS resources with different numbers of transmit chains and different port virtualizations. For example, the base station may configure (e.g., according to the rule) different SRS resource sets 805. Different SRS resource sets 805 may be associated with different numbers of transmit chains. For example, SRS resource set 805-*a* may be associated with two transmit chains, and SRS resource set 805-*b* may be associated with three transmit chains. Thus, SRS resources in SRS resource set 805-*a* may indicate that the UE is to use two transmit chains for transmitting SRSs, and SRS resources in SRS resource set 805-*b* may indicate that the UE is to use three transmitting chains for transmitting SRSs.

SRS resource 0 and SRS resource 1 may be in SRS resource set 805-*a*, and SRS resource 2 and SRS resource 3 may be in SRS resource set 805-*b*. The base station may configure SRS resource 0 with two ports (e.g., port 0 and port 1), and may configure SRS resource 1 with one port (e.g., port 0). The base station may configure SRS resource 2 with three ports (e.g., port 0, port 1, and port 2). If the base station indicates SRS resource 0 (e.g., via an SRI in the DCI), then the UE may transmit using two transmit chains (e.g., transmit chain 810-*a* and transmit chain 810-*b*). Each port may be mapped to one of the two transmit chains 810. If the base station indicates SRS resource 1 (e.g., via an SRI in the DCI), then the UE may transmit using two transmit chains virtualized to port 0. That is, the UE may virtualize transmit chain 810-*a* and transmit chain 810-*b* to port 0. If the base station indicates SRS resource 2 (e.g., via an SRI in the DCI), then the UE may transmit using three transmit chains (e.g., transmit chain 810-*a*, transmit chain 810-*b*, and transmit chain 810-*c*). Each port may be mapped to one of the three transmit chains 810. If the base station indicates SRS resource 3 (e.g., via an SRI in the DCI), then the UE may transmit using three transmit chains virtualized to the two configured ports. That is, the UE may virtualize transmit chain 810-*a* and transmit chain 810-*b* to port 0, and may map transmit chain 810-*c* to port 1.

Figure 9:
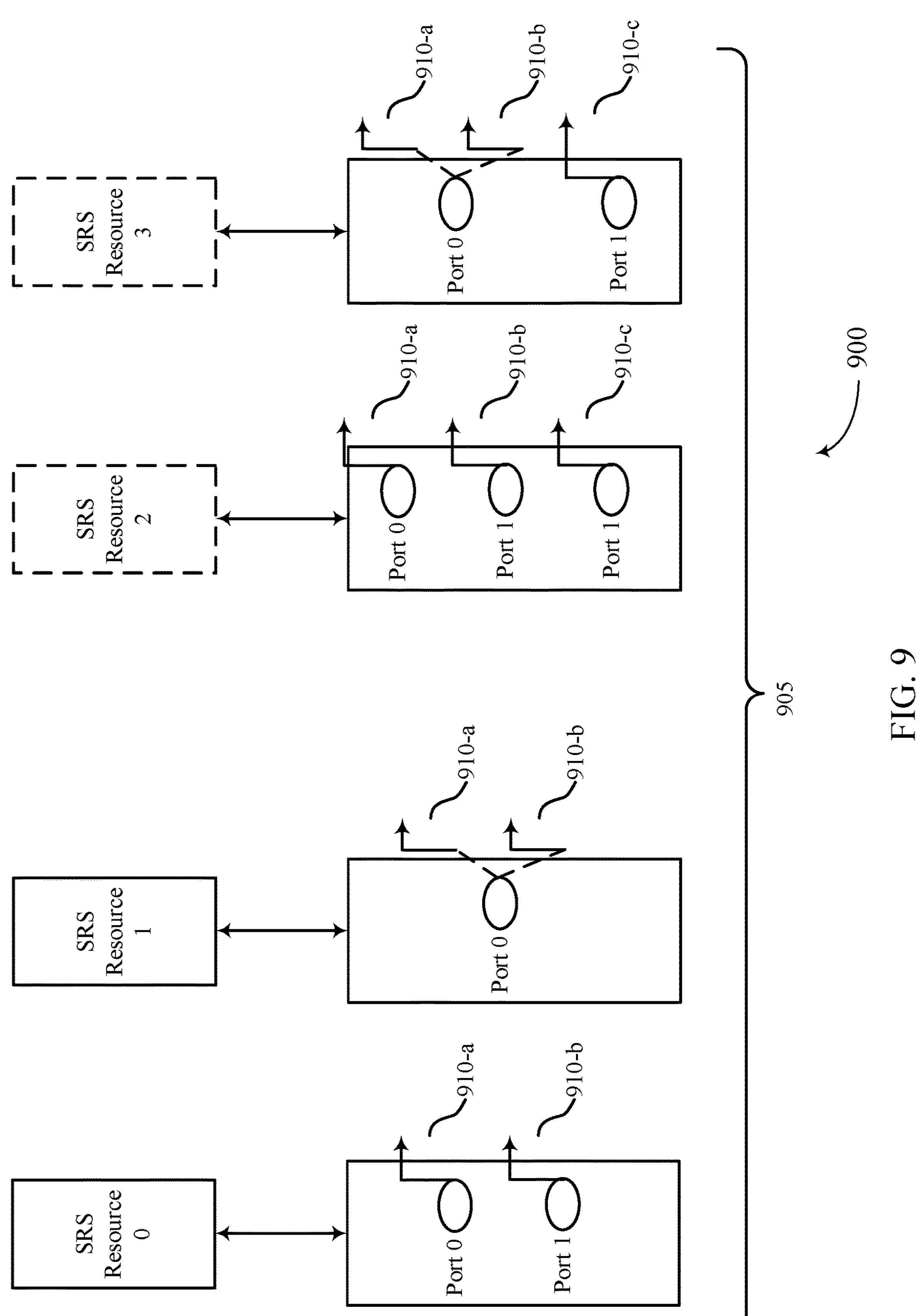
FIG. 9 illustrates an example of an SRS resource configuration that supports codebook-based sounding reference signal and precoding matrix indicator configurations in accordance with aspects of the present disclosure.

FIG. 9 illustrates an example of an SRS configuration 900 that supports codebook-based sounding reference signal and precoding matrix indicator configurations in accordance with aspects of the present disclosure. SRS configuration 900 may be configured and implemented by one or more wireless devices, such as UEs (e.g., UEs 115) and base stations (e.g., base stations 105) which may be examples of corresponding devices as described with reference to FIGS. 1-8.

In some examples, where full power mode 2 is configured for cases where the UE supports both two transmit chains and three transmit chains on carrier 2, a rule may be defined to distinguish SRS resources with different numbers of transmit chains and different port virtualizations. For example, the base station may configure (e.g., according to the rule) an SRS resource set 905. An SRS resource may be associated with two transmit chains or three transmit chains based on an order of SRIs. For instance, SRIs may be indexed such that SRS resources for three transmit chains are indexed after the SRS resources for two transmit chains (e.g., or vice versa). Thus, SRS resources in SRS resource set 905 that are indexed in a first portion of the set of SRIs (e.g., SRS resource 0 and SRS resource 1) may indicate that the UE is to use two transmit chains for transmitting SRSs, and SRS resources in SRS resource set 905 that are indexed in a second portion of the set of SRIs (e.g., SRS resource 2 and SRS resource 3) may indicate that the UE is to use three transmitting chains for transmitting SRSs.

The base station may indicate a number of transmit chains to use (e.g., and a virtualization of transmit chains to ports in some cases) via an SRI included in a DCI. The base station may configure SRS resource 0 with two ports (e.g., port 0 and port 1), and may configure SRS resource 1 with one port (e.g., port 0). The base station may configure SRS resource 2 with three ports (e.g., port 0, port 1, and port 2). If the base station indicates SRS resource 0 (e.g., via an SRI in the DCI), then the UE may transmit using two transmit chains (e.g., transmit chain 910-*a* and transmit chain 910-*b*). Each port may be mapped to one of the two transmit chains 910. If the base station indicates SRS resource 1 (e.g., via an SRI in the DCI), then the UE may transmit using two transmit chains virtualized to port 0. That is, the UE may virtualize transmit chain 910-*a* and transmit chain 910-*b* to port 0. If the base station indicates SRS resource 2 (e.g., via an SRI in the DCI), then the UE may transmit using three transmit chains (e.g., transmit chain 910-*a*, transmit chain 910-*b*, and transmit chain 910-*c*). Each port may be mapped to one of the three transmit chains 810. If the base station indicates SRS resource 3 (e.g., via an SRI in the DCI), then the UE may transmit using three transmit chains virtualized to the two configured ports. That is, the UE may virtualize transmit chain 910-*a* and transmit chain 910-*b* to port 0, and may map transmit chain 910-*c* to port 1.

Figure 10:
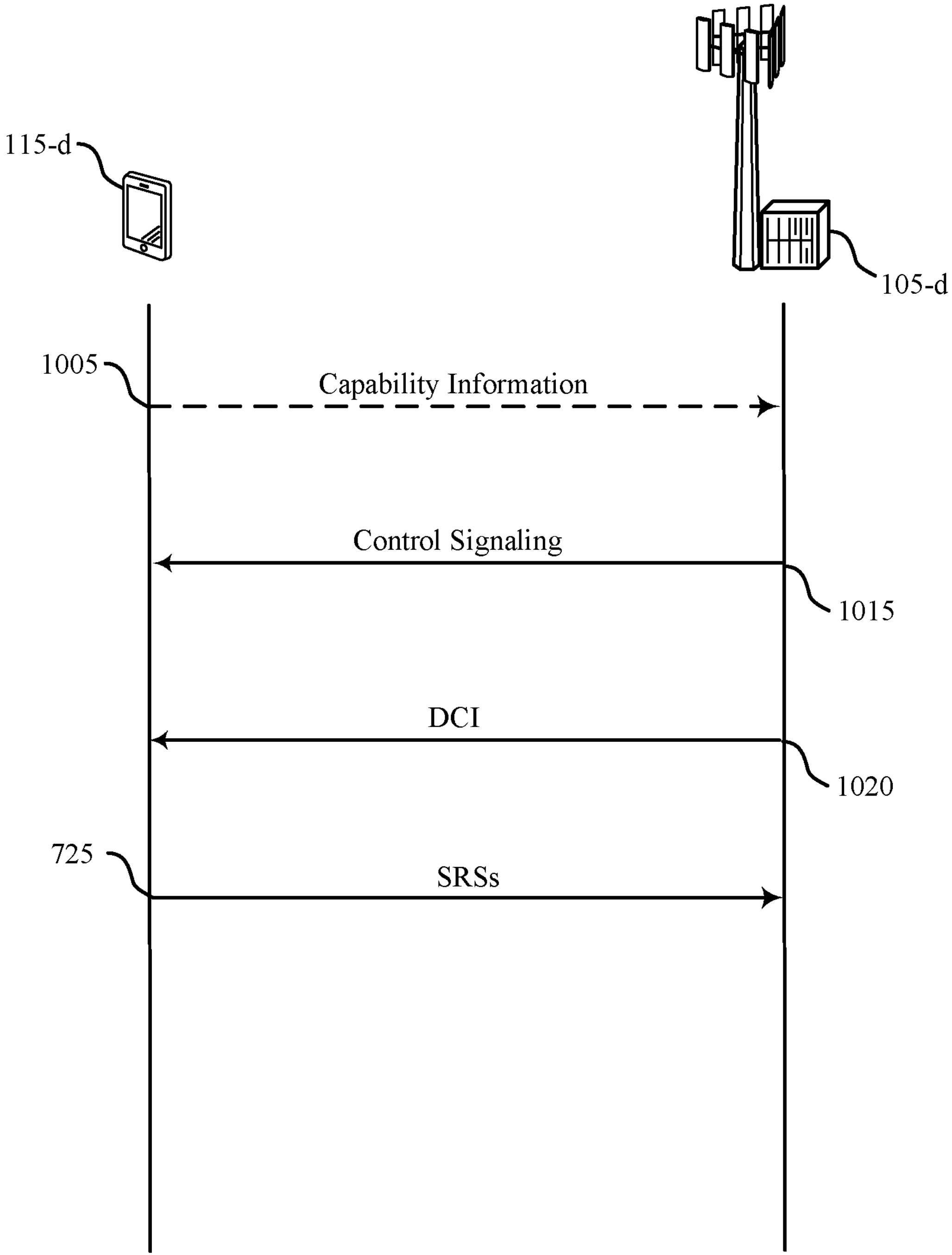
FIG. 10 illustrates an example of a process flow that supports codebook-based sounding reference signal and precoding matrix indicator configurations in accordance with aspects of the present disclosure.

FIG. 10 illustrates an example of a process flow 1000 that supports codebook-based sounding reference signal and precoding matrix indicator configurations in accordance with aspects of the present disclosure. Process flow 1000 may include a base station 105-*d* and a UE 115-*d*, which may be examples of corresponding devices described with reference to FIGS. 1-9. In some examples, as illustrated with reference to FIG. 10, both two transmit chains and three transmit chains may be supported on carrier 2. UE 115-*d* may support both two-port and three-port uplink transmissions indicated by a DCI (e.g., DCI format 01) for uplink carrier aggregation with transmit chain switching.

At 1005, the UE 115-*d* may transmit, and the base station 105-*d* may receive, capability information. THE capability information may indicate that the UE 115-*d* is capable of supporting multiple SRS resources in one SRS resource set associated with different numbers of antenna ports.

At 1015, the base station 105-*d* may transmit, and the UE 115-*d* may receive, control signaling indicating mapping between different numbers of ports to different SRS resources. The control signaling may indicate a first mapping of a first number of one or more antenna ports to a first SRS resource of multiple SRS resources in an SRS resource set. In some examples, the base station 105-*d* may transmit the control signaling based at least in part on having received (e.g., responsive to) the capability information at 1005.

At 1020, the base station 105-*d* may transmit, and the UE 115-*d* may receive, an uplink grant (e.g., via a DCI). The DCI may indicate an SRI corresponding to one of the SRS resources (e.g., that was configured with a number of ports at 1015). The uplink grant may also include an indication of a TPMI for the UE to use to transmit the SRSs. The TPMI may indicate a number of transmit chains for the UE to use for precoding and transmitting the SRSs.

For example, the UE 115-*d* is not configured with a power mode (e.g., full power mode 2), and base station 105-*d* may have configured the UE 115-*d* with a three-port SRS resource (e.g., at 1015) configured for codebook-based transmissions on carrier 2. If the power mode is not enabled, then the UE 115-*d* may not support three transmit chains in SRS resources without three ports. In such examples, two-transmit chain transmissions and three-transmit chain transmissions may share a TPMI table used for three transmit chains. The base station 105-*d* may configure the UE 115-*d* with the TPMI table. A first subset of TPMIs in the TPMI table may be associated with two-transmit chain transmissions, and a second subset of TPMIs in the TPMI table may be associated with three-transmit chain transmissions. For instance, a TPMI vector may include one or more coefficients equal to zero. If values on the last (e.g., bottom row) of a TPMI vector (e.g., matrix) are equal to zero, then the UE 115-*d* may assume that the TPMI is for a two-transmit chain transmission. If the last (e.g., bottom row) of a TPMI matrix is not equal to zero, then the UE 115-*d* may assume that the TPMI is for a three-transmit chain transmission. For example, a TPMI equal to $$\frac{1}{\sqrt{3}}\begin{bmatrix} x \\ y \\ 0 \end{bmatrix}$$

for rank 1, or $$\frac{1}{\sqrt{3}}\begin{bmatrix} a & b \\ c & d \\ 0 & 0 \end{bmatrix}$$

for rank 2, etc. (e.g., where x, y, a, b, c, and d, represent any value), may indicate a two-transmit chain transmission on carrier 2. Such selected TPMIs may refer to all precoders with elements in the third row equal to zero. PUSCH transmissions with all other TPMIs (e.g., that do not have zeros in the third row) may be considered as TPMIs for three transmit chains on carrier 2. In some examples, the matrix may include a single column (e.g., a vector).

In some examples, where power mode 2 is enabled for the UE 115-*d*, the UE may also determine a virtualization of transmit chains to ports in an SRS resource, as described in greater detail with reference to FIG. 11.

At 1025, the UE 115-*d* may transmit one or more SRSs on the SRS resource indicated by the SRI and using a number of transmit chains indicated by the TPMI.

Figure 11:
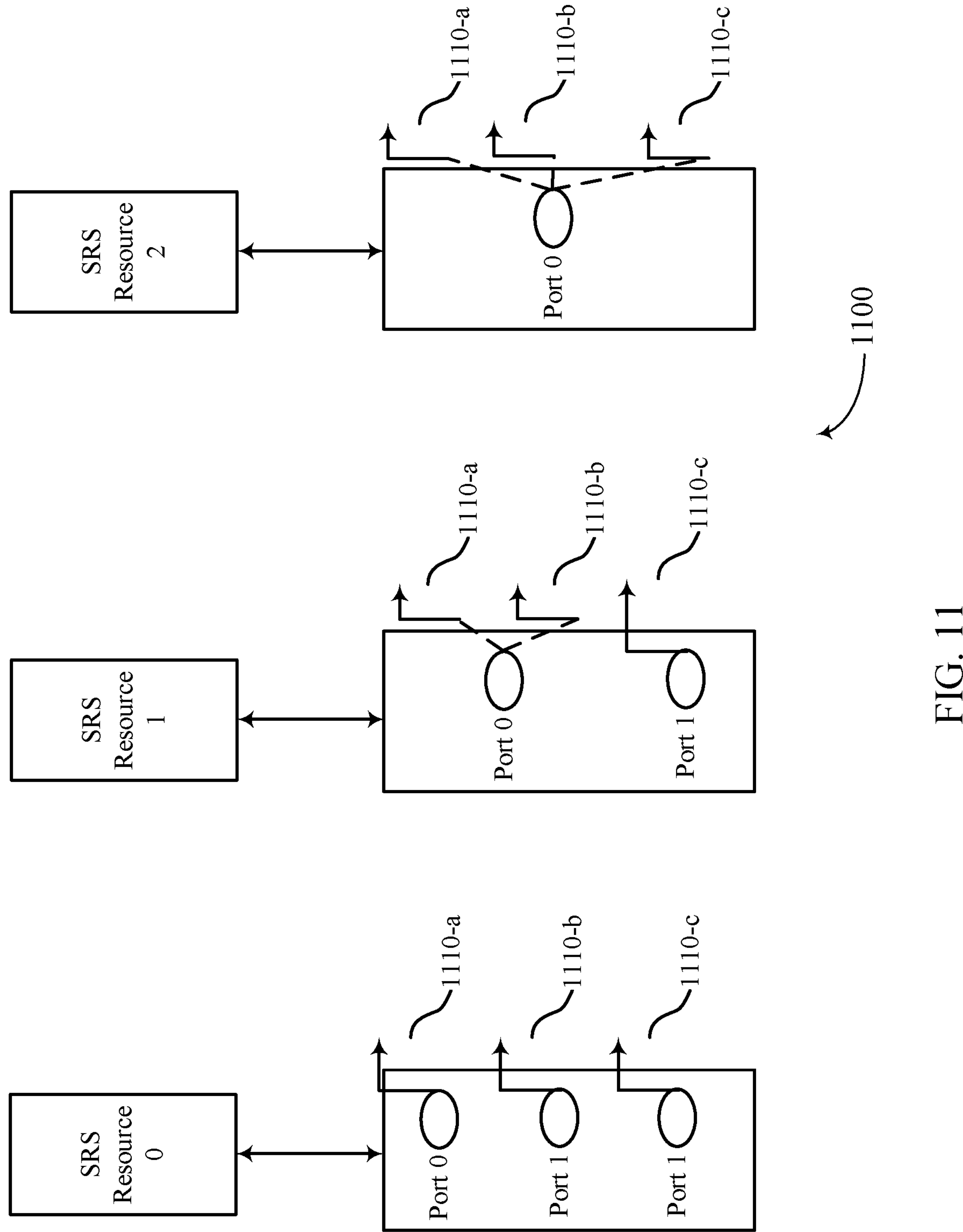
FIG. 11 illustrates an example of an SRS resource configuration that supports codebook-based sounding reference signal and precoding matrix indicator configurations in accordance with aspects of the present disclosure.

FIG. 11 illustrates an example of an SRS resource configuration 1100 that supports codebook-based sounding reference signal and precoding matrix indicator configurations in accordance with aspects of the present disclosure. SRS resource configuration 1100 may be implemented by one or more wireless devices (e.g., UEs 115 and base station 105), which may be examples of corresponding devices described with reference to FIGS. 1-10.

In some examples, a UE and a base station may communicate with each other, and both two transmit chains and three transmit chains may be supported on carrier 2. Additionally, or alternatively, a power mode (e.g., full power mode 2) may be enabled for the UE. In such examples, the UE may support configuration of SRS resources with various numbers of antenna ports (e.g., 1, 2, or 3). For example, in the same SRS resource set or in different SRS resource sets, the base station may configure SRS resource 0 with three ports, SRS resource 1 with two ports, and SRS resource 2 with one port. Two and three transmit chains may share the same resource. That is, the base station may indicate whether the UE is to use two transmit chains or three transmit chains using the TPMI in a DCI message.

For SRS resources configured with three ports (e.g., SRS resource 0), the TPMI may indicate two transmit chains or three transmit chains, as described in greater detail with reference to FIG. 10. For example, TPMIs indicating a precoder with elements in the final (E.g., third) row equal to zero may indicate that the UE is to perform a two-transmit chain transmission. PUSCH transmission with all other TPMIs may be considered to indicate three-transmit chain transmissions on carrier 2. That is, TPMIs indicating a precoding with non-zero elements in the final (e.g., third) row may indicate that the UE is to perform a three-transmit chain transmission.

For SRS resources configured with 2 ports (e.g., SRS resource 1) or one port (e.g., SRS resource 2), the UE may virtualize three transmit chains into two ports (e.g., for SRS resource 1) or may virtualize two fixed transmit chains on carrier 2 as one port (e.g., for SRS resource 2). For example, for an SRS resource configured with two ports (e.g., SRS resource 1), for a PUSCH transmission with a TPMI equal to $1/\sqrt{2}$ [1/0], the UE may consider to be a two-transmit chain transmission on carrier 2, and may virtualize two fixed transmit chins into one port (e.g., transmit chain 110-*a* and transmit chain 110-*b* to port 0). For all other PUSCH transmissions with TPMIs with non-zero values in the final row, the UE may map three transmit chains to available ports. For instance, the UE may map transmit chains 1110-*a* and transmit chain 110-*b* to port 0, and may map transmit chain 1110-*c* to port 1. For an SRS resource with one port (e.g., SRS resource 2), the UE may virtualize three transmit chains (e.g., transmit chains 1110-*a*, transmit chain 110-*b*, and transmit chain 1110-*c*) to port 0. That is, in some examples, an SRS resource configured with one port may be used only for three transmit chains, while the TPMI may indicate to the UE whether to use SRS resource 0 and SRS resource 1 for two transmit chains or three transmit chains.

Thus, as described with reference to FIG. 11, the base station may configure the SRS resources with differing numbers of ports (e.g., if power mode 2 is enabled). The base station may indicate, using the TPMI, whether the UE is to use two transmit chains or three transmit chains.

Figure 12:
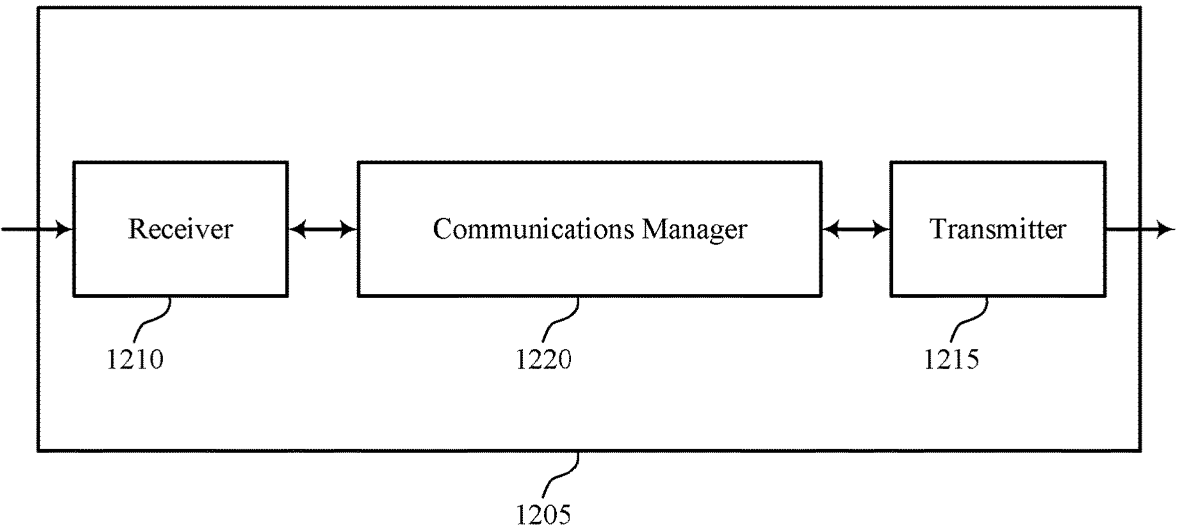
FIGS. 12 and 13 show block diagrams of devices that support codebook-based sounding reference signal and precoding matrix indicator configurations in accordance with aspects of the present disclosure.

FIG. 12 shows a block diagram 1200 of a device 1205 that supports codebook-based sounding reference signal and precoding matrix indicator configurations in accordance with aspects of the present disclosure. The device 1205 may be an example of aspects of a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to codebook-based sounding reference signal and precoding matrix indicator configurations). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to codebook-based sounding reference signal and precoding matrix indicator configurations). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of codebook-based sounding reference signal and precoding matrix indicator configurations as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a UE in accordance with examples as disclosed herein. For example, the communications manager

1220 may be configured as or otherwise support a means for transmitting, to a base station, a message indicating that the UE is capable of supporting multiple sounding reference signal resources in one sounding reference signal resource set associated with differing numbers of antenna ports. The communications manager 1220 may be configured as or otherwise support a means for receiving, from the base station, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set. The communications manager 1220 may be configured as or otherwise support a means for receiving, from the base station, an uplink grant indicating a sounding reference signal resource index corresponding to the first sounding reference signal resource. The communications manager 1220 may be configured as or otherwise support a means for transmitting, via the first sounding reference signal resource, a set of multiple sounding reference signals via the first number of antenna ports using the first number of transmit chains.

Additionally, or alternatively, the communications manager 1220 may support wireless communications at a UE in accordance with examples as disclosed herein. For example, the communications manager 1220 may be configured as or otherwise support a means for transmitting, to a base station, a message indicating that the UE is capable of supporting multiple sounding reference signal resources in one sounding reference signal resource set associated with differing numbers of antenna ports. The communications manager 1220 may be configured as or otherwise support a means for receiving, from the base station, control signaling indicating a first mapping of a first number of one or more antenna ports to a first sounding reference signal resource of a set of multiple sounding reference signal resources of a sounding reference signal resource set. The communications manager 1220 may be configured as or otherwise support a means for receiving, from the base station, an uplink grant indicating a sounding reference signal resource index corresponding to the first sounding reference signal resource and indicating a precoding matrix indicator corresponding to a first number of transmit chains. The communications manager 1220 may be configured as or otherwise support a means for transmitting, via the first sounding reference signal resource and in accordance with the precoding matrix indicator, a set of multiple sounding reference signals via the first number of one or more antenna ports using the first number of transmit chains.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for transmit chain switching, which may result in increased throughput, more efficient use of available computational and wireless resources, decreased thermal costs at the UE, decreased system latency, and improved user experience.

Figure 13:
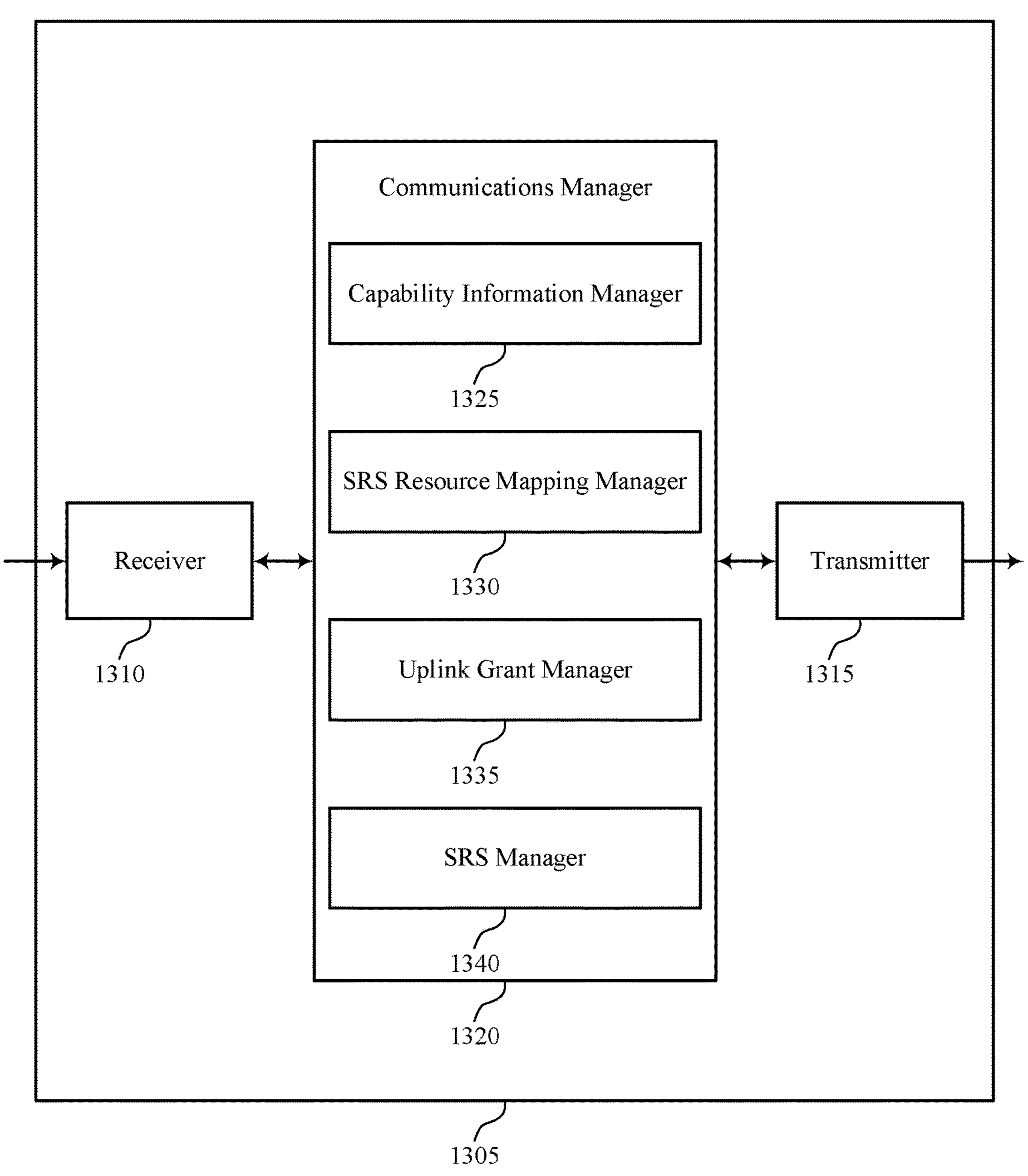

FIG. 13 shows a block diagram 1300 of a device 1305 that supports codebook-based sounding reference signal and precoding matrix indicator configurations in accordance with aspects of the present disclosure. The device 1305 may be an example of aspects of a device 1205 or a UE 115 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to codebook-based sounding reference signal and precoding matrix indicator configurations). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to codebook-based sounding reference signal and precoding matrix indicator configurations). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of codebook-based sounding reference signal and precoding matrix indicator configurations as described herein. For example, the communications manager 1320 may include a capability information manager 1325, an SRS resource mapping manager 1330, an uplink grant manager 1335, an SRS manager 1340, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a UE in accordance with examples as disclosed herein. The capability information manager 1325 may be configured as or otherwise support a means for transmitting, to a base station, a message indicating that the UE is capable of supporting multiple sounding reference signal resources in one sounding reference signal resource set associated with differing numbers of antenna ports. The SRS resource mapping manager 1330 may be configured as or otherwise support a means for receiving, from the base station, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set. The uplink grant manager 1335 may be configured as or otherwise support a means for receiving, from the base station, an uplink grant indicating a sounding reference signal resource index corresponding to the first sounding reference signal resource. The SRS manager 1340 may be configured as or otherwise support a means for transmitting, via the first sounding reference signal resource, a set of multiple sounding reference signals via the first number of antenna ports using the first number of transmit chains.

Additionally, or alternatively, the communications manager 1320 may support wireless communications at a UE in accordance with examples as disclosed herein. The capability information manager 1325 may be configured as or otherwise support a means for transmitting, to a base station, a message indicating that the UE is capable of supporting multiple sounding reference signal resources in one sounding reference signal resource set associated with differing numbers of antenna ports. The SRS resource mapping manager 1330 may be configured as or otherwise support a means for receiving, from the base station, control signaling indicating a first mapping of a first number of one or more antenna ports to a first sounding reference signal resource of a set of multiple sounding reference signal resources of a sounding reference signal resource set. The uplink grant manager 1335 may be configured as or otherwise support a means for receiving, from the base station, an uplink grant indicating a sounding reference signal resource index corresponding to the first sounding reference signal resource and indicating a precoding matrix indicator corresponding to a first number of transmit chains. The SRS manager 1340 may be configured as or otherwise support a means for transmitting, via the first sounding reference signal resource and in accordance with the precoding matrix indicator, a set of multiple sounding reference signals via the first number of one or more antenna ports using the first number of transmit chains.

Figure 14:
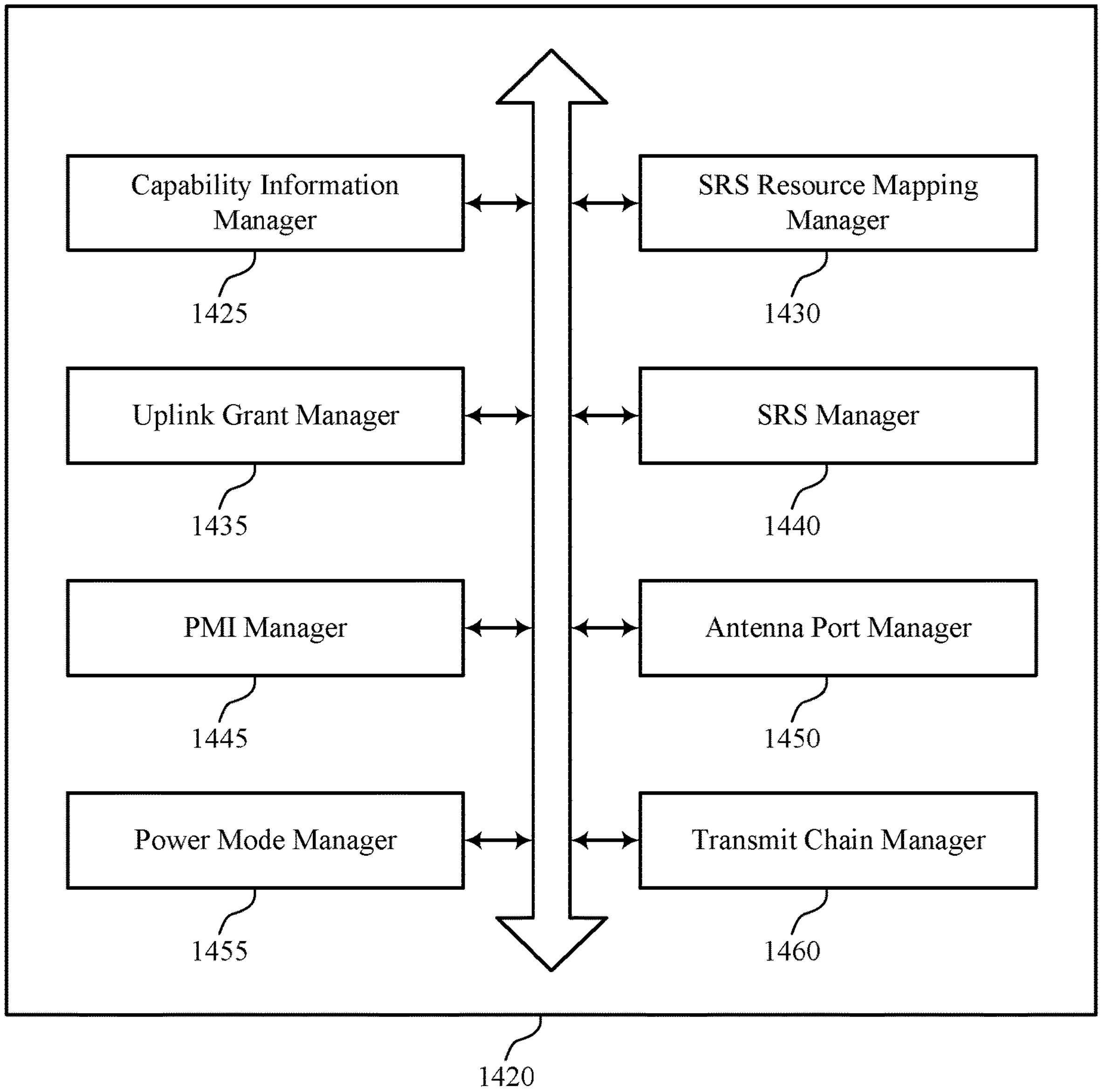
FIG. 14 shows a block diagram of a communications manager that supports codebook-based sounding reference signal and precoding matrix indicator configurations in accordance with aspects of the present disclosure.

FIG. 14 shows a block diagram 1400 of a communications manager 1420 that supports codebook-based sounding reference signal and precoding matrix indicator configurations in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of codebook-based sounding reference signal and precoding matrix indicator configurations as described herein. For example, the communications manager 1420 may include a capability information manager 1425, an SRS resource mapping manager 1430, an uplink grant manager 1435, an SRS manager 1440, a PMI manager 1445, an antenna port manager 1450, a power mode manager 1455, a transmit chain manager 1460, or any combination thereof. Each of these components may communicate, directly or indirectly, with one another (e.g., via one or more buses).

The communications manager 1420 may support wireless communications at a UE in accordance with examples as disclosed herein. The capability information manager 1425 may be configured as or otherwise support a means for transmitting, to a base station, a message indicating that the UE is capable of supporting multiple sounding reference signal resources in one sounding reference signal resource set associated with differing numbers of antenna ports. The SRS resource mapping manager 1430 may be configured as or otherwise support a means for receiving, from the base station, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set. The uplink grant manager 1435 may be configured as or otherwise support a means for receiving, from the base station, an uplink grant indicating a sounding reference signal resource index corresponding to the first sounding reference signal resource. The SRS manager 1440 may be configured as or otherwise support a means for transmitting, via the first sounding reference signal resource, a set of multiple sounding reference signals via the first number of antenna ports using the first number of transmit chains.

In some examples, to support receiving the control signaling, the SRS resource mapping manager 1430 may be configured as or otherwise support a means for receiving the control signaling indicating a mapping of the first number of transmit chains to the second sounding reference signal resource of the sounding reference signal resource set.

In some examples, to support receiving the control signaling, the SRS resource mapping manager 1430 may be configured as or otherwise support a means for receiving the control signaling indicating a mapping of a second number of transmit chains to the second sounding reference signal resource of the sounding reference signal resource set.

In some examples, to support receiving the uplink grant, the PMI manager 1445 may be configured as or otherwise support a means for receiving a downlink control information message including the uplink grant and an indication of a precoding matrix indicator for transmitting the set of multiple sounding reference signal.

In some examples, the PMI manager 1445 may be configured as or otherwise support a means for precoding the set of multiple sounding reference signals according to the precoding matrix indicator, where transmitting the set of multiple sounding reference signals is based on the precoding.

In some examples, the PMI manager 1445 may be configured as or otherwise support a means for receiving, from the base station, control signaling indicating a set of precoding matrix indicators, where the indication of the precoding matrix indicator is one of the set of precoding matrix indicators.

In some examples, to support transmitting the set of multiple sounding reference signals, the SRS manager 1440 may be configured as or otherwise support a means for transmitting the set of multiple sounding reference signals on a single component carrier.

In some examples, the antenna port manager 1450 may be configured as or otherwise support a means for receiving, from the base station, an indication to use three antenna ports for transmissions on a single component carrier supporting a second number of transmit chains, where the second number of transmit chains includes three transmit chains.

In some examples, the first number of transmit chains is two transmit chains and a second number of transmit chains is three transmit chains. In some examples, the first number of transmit chains is three transmit chains and the second number of transmit chains is two transmit chains.

Additionally, or alternatively, the communications manager 1420 may support wireless communications at a UE in accordance with examples as disclosed herein. In some examples, the capability information manager 1425 may be configured as or otherwise support a means for transmitting, to a base station, a message indicating that the UE is capable of supporting multiple sounding reference signal resources in one sounding reference signal resource set associated with differing numbers of antenna ports. In some examples, the SRS resource mapping manager 1430 may be configured as or otherwise support a means for receiving, from the base station, control signaling indicating a first mapping of a first number of one or more antenna ports to a first sounding reference signal resource of a set of multiple sounding reference signal resources of a sounding reference signal resource set. In some examples, the uplink grant manager 1435 may be configured as or otherwise support a means for receiving, from the base station, an uplink grant indicating a sounding reference signal resource index corresponding to the first sounding reference signal resource and indicating a precoding matrix indicator corresponding to a first number of transmit chains. In some examples, the SRS manager 1440 may be configured as or otherwise support a means for transmitting, via the first sounding reference signal resource and in accordance with the precoding matrix indicator, a set of multiple sounding reference signals via the first number of one or more antenna ports using the first number of transmit chains.

In some examples, to support receiving the uplink grant, the power mode manager 1455 may be configured as or otherwise support a means for receiving the uplink grant indicating that a power mode is disabled and the precoding matrix indicator that indicates a vector including a number of non-zero coefficients corresponding to the first number of transmit chains.

In some examples, to support receiving the uplink grant, the power mode manager 1455 may be configured as or otherwise support a means for receiving the uplink grant indicating that a power mode is enabled and that the precoding matrix indicator indicates a vector including a number of non-zero coefficients that is fewer than the first number of transmit chains, where multiple transmit chains of the first number of transmit chains transmit multiple sounding reference signals of the set of multiple sounding reference signals via a same antenna port of the first number of one or more antenna ports.

In some examples, the SRS resource mapping manager 1430 may be configured as or otherwise support a means for receiving, from the base station, control signaling indicating a first mapping of the first number of transmit chains to a first set of precoding matrix indicators including the first precoding matrix indicator, and a second mapping of a second number of transmit chains to a second set of precoding matrix indicators.

In some examples, the transmit chain manager 1460 may be configured as or otherwise support a means for selecting, based on the precoding matrix indicator, the first number of transmit chains from a set of candidate numbers of transmit chains.

Figure 15:
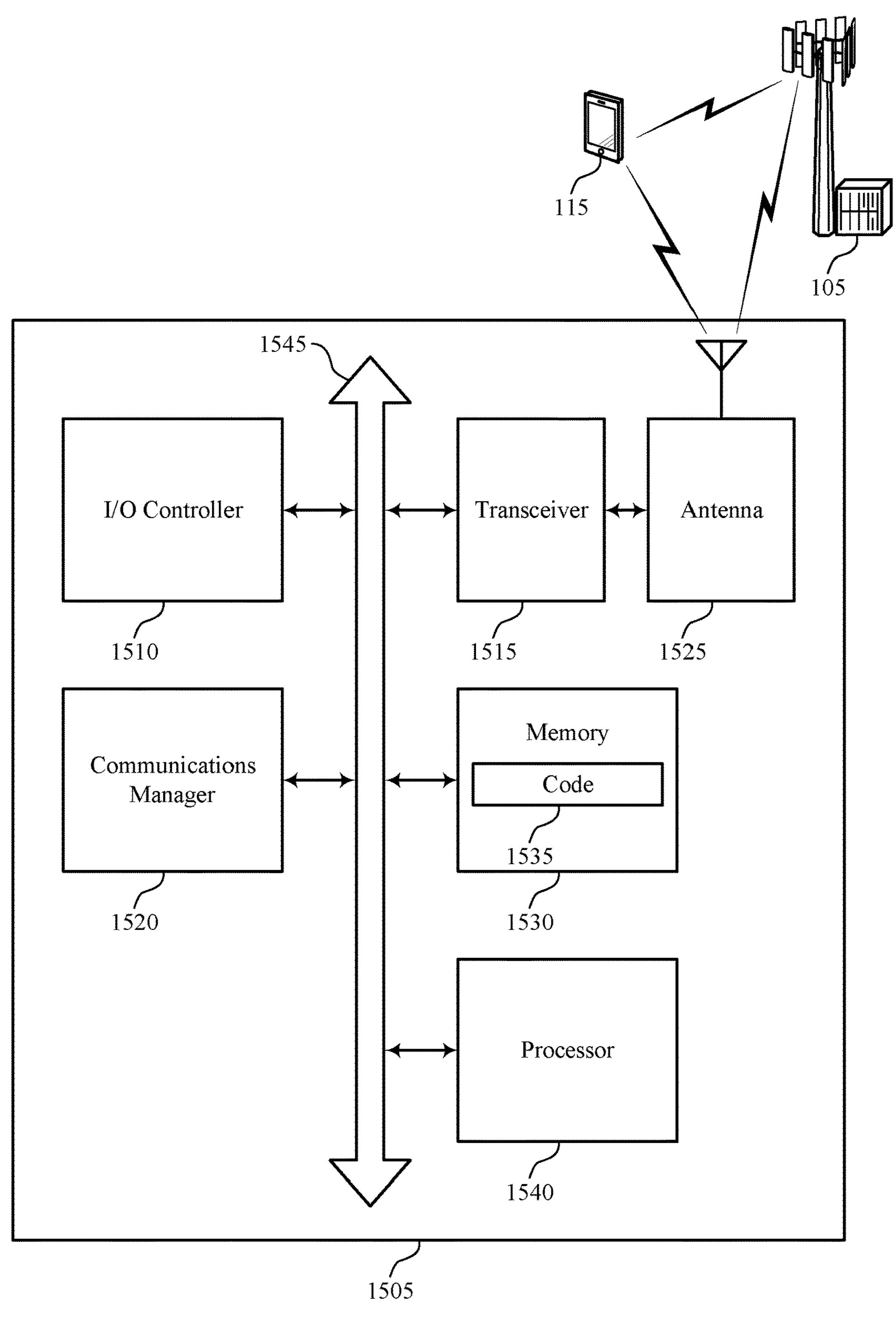
FIG. 15 shows a diagram of a system including a device that supports codebook-based sounding reference signal and precoding matrix indicator configurations in accordance with aspects of the present disclosure.

FIG. 15 shows a diagram of a system 1500 including a device 1505 that supports codebook-based sounding reference signal and precoding matrix indicator configurations in accordance with aspects of the present disclosure. The device 1505 may be an example of or include the components of a device 1205, a device 1305, or a UE 115 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, a memory 1530, code 1535, and a processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally, or alternatively, the I/O controller 1510 may represent or interact with a modem, a keyboard, a mouse, a touchscreen, or a similar device. In some cases, the I/O controller 1510 may be implemented as part of a processor, such as the processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include random access memory (RAM) and read-only memory (ROM). The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a basic I/O system (BIOS) which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting codebook-based sounding reference signal and precoding matrix indicator configurations). For example, the device 1505 or a component of the device 1505 may include a processor 1540 and memory 1530 coupled to the processor 1540, the processor 1540 and memory 1530 configured to perform various functions described herein.

The communications manager 1520 may support wireless communications at a UE in accordance with examples as disclosed herein. For example, the communications manager 1520 may be configured as or otherwise support a means for transmitting, to a base station, a message indicating that the UE is capable of supporting multiple sounding reference signal resources in one sounding reference signal resource set associated with differing numbers of antenna ports. The communications manager 1520 may be configured as or otherwise support a means for receiving, from the base station, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set. The communications manager 1520 may be configured as or otherwise support a means for receiving, from the base station, an uplink grant indicating a sounding reference signal resource index corresponding to the first sounding reference signal resource. The communications manager 1520 may be configured as or otherwise support a means for transmitting, via the first sounding reference signal resource, a set of multiple sounding reference signals via the first number of antenna ports using the first number of transmit chains.

Additionally, or alternatively, the communications manager 1520 may support wireless communications at a UE in accordance with examples as disclosed herein. For example, the communications manager 1520 may be configured as or otherwise support a means for transmitting, to a base station, a message indicating that the UE is capable of supporting multiple sounding reference signal resources in one sounding reference signal resource set associated with differing numbers of antenna ports. The communications manager 1520 may be configured as or otherwise support a means for receiving, from the base station, control signaling indicating a first mapping of a first number of one or more antenna ports to a first sounding reference signal resource of a set of multiple sounding reference signal resources of a sounding reference signal resource set. The communications manager 1520 may be configured as or otherwise support a means for receiving, from the base station, an uplink grant indicating a sounding reference signal resource index corresponding to the first sounding reference signal resource and indicating a precoding matrix indicator corresponding to a first number of transmit chains. The communications manager 1520 may be configured as or otherwise support a means for transmitting, via the first sounding reference signal resource and in accordance with the precoding matrix indicator, a set of multiple sounding reference signals via the first number of one or more antenna ports using the first number of transmit chains.

By including or configuring the communications manager 1520 in accordance with examples as described herein, the device 1505 may support techniques for transmit chain switching, which may result in increased throughput, more efficient use of available computational and wireless resources, decreased thermal costs at the UE, decreased system latency, and improved user experience.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of codebook-based sounding reference signal and precoding matrix indicator configurations as described herein, or the processor 1540 and the memory 1530 may be otherwise configured to perform or support such operations.

Figure 16:
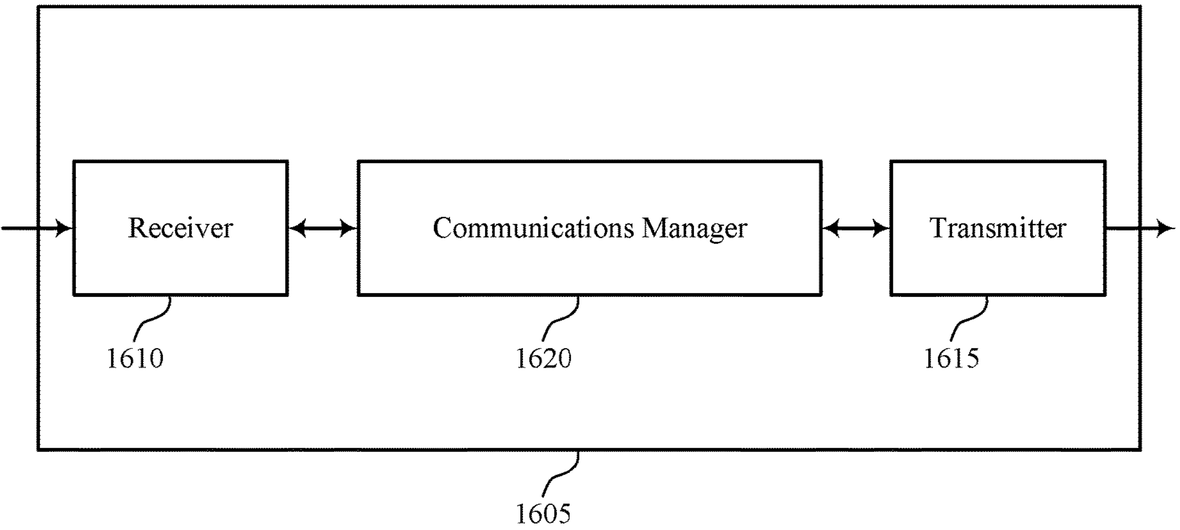
FIGS. 16 and 17 show block diagrams of devices that support codebook-based sounding reference signal and precoding matrix indicator configurations in accordance with aspects of the present disclosure.

FIG. 16 shows a block diagram 1600 of a device 1605 that supports codebook-based sounding reference signal and precoding matrix indicator configurations in accordance with aspects of the present disclosure. The device 1605 may be an example of aspects of a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to codebook-based sounding reference signal and precoding matrix indicator configurations). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to codebook-based sounding reference signal and precoding matrix indicator configurations). In some examples, the transmitter 1615 may be co-located with a receiver 1610 in a transceiver module. The transmitter 1615 may utilize a single antenna or a set of multiple antennas.

The communications manager 1620, the receiver 1610, the transmitter 1615, or various combinations thereof or various components thereof may be examples of means for performing various aspects of codebook-based sounding reference signal and precoding matrix indicator configurations as described herein. For example, the communications manager 1620, the receiver 1610, the transmitter 1615, or various combinations or components thereof may support a method for performing one or more of the functions described herein.

In some examples, the communications manager 1620, the receiver 1610, the transmitter 1615, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1620, the receiver 1610, the transmitter 1615, or various combinations or components thereof may be implemented in code (e.g., as communications management software or firmware) executed by a processor. If implemented in code executed by a processor, the functions of the communications manager 1620, the receiver 1610, the transmitter 1615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1620 may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communications at a base station in accordance with examples as disclosed herein. For example, the communications manager 1620 may be configured as or otherwise support a means for receiving, from a UE, a message indicating that the UE is capable of supporting multiple sounding reference signal resources in one sounding reference signal resource set associated with differing numbers of antenna ports. The communications manager 1620 may be configured as or otherwise support a means for transmitting, to the UE, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set. The communications manager 1620 may be configured as or otherwise support a means for transmitting, to the UE, an uplink grant indicating a sounding reference signal resource index corresponding to the first sounding reference signal resource. The communications manager 1620 may be configured as or otherwise support a means for receiving, via the first sounding reference signal resource, a set of multiple sounding reference signals via the first number of antenna ports using the first number of transmit chains.

Additionally, or alternatively, the communications manager 1620 may support wireless communications at a base station in accordance with examples as disclosed herein. For example, the communications manager 1620 may be configured as or otherwise support a means for receiving, from a UE, a message indicating that the UE is capable of supporting multiple sounding reference signal resources in one sounding reference signal resource set associated with differing numbers of antenna ports. The communications manager 1620 may be configured as or otherwise support a means for transmitting, to the UE, control signaling indicating a first mapping of a first number of one or more antenna ports to a first sounding reference signal resource of a set of multiple sounding reference signal resources of a sounding reference signal resource set. The communications manager 1620 may be configured as or otherwise support a means for transmitting, to the UE, an uplink grant indicating a sounding reference signal resource index corresponding to the first sounding reference signal resource and indicating a precoding matrix indicator corresponding to a first number of transmit chains. The communications manager 1620 may be configured as or otherwise support a means for receiving, via the first sounding reference signal resource and in accordance with the precoding matrix indicator, a set of multiple sounding reference signals via the first number of one or more antenna ports using the first number of transmit chains.

By including or configuring the communications manager 1620 in accordance with examples as described herein, the device 1605 (e.g., a processor controlling or otherwise coupled to the receiver 1610, the transmitter 1615, the communications manager 1620, or a combination thereof) may support techniques for transmit chain switching, which may result in increased throughput, more efficient use of available computational and wireless resources, decreased thermal costs at the UE, decreased system latency, and improved user experience.

Figure 17:
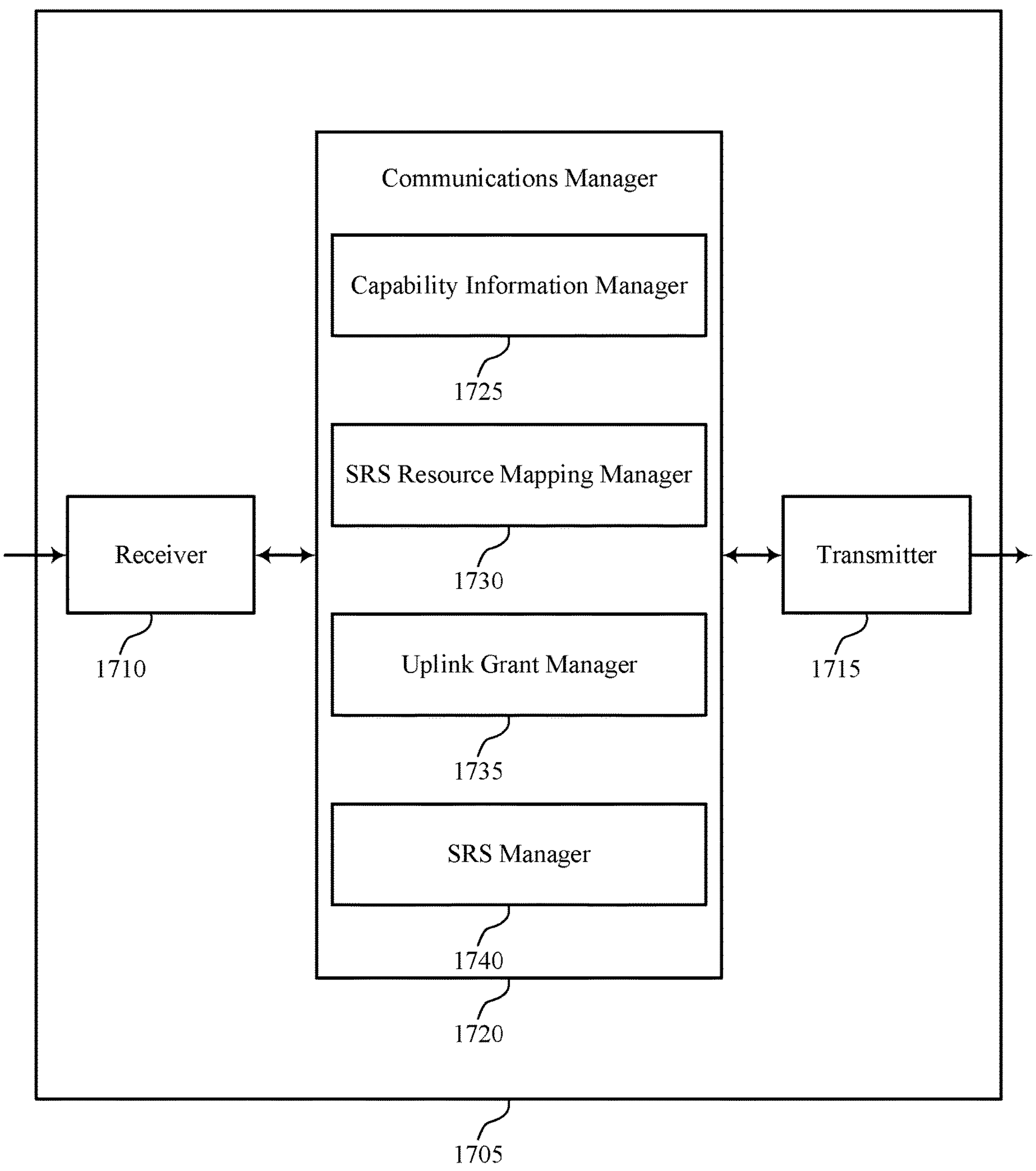

FIG. 17 shows a block diagram 1700 of a device 1705 that supports codebook-based sounding reference signal and precoding matrix indicator configurations in accordance with aspects of the present disclosure. The device 1705 may be an example of aspects of a device 1605 or a base station 105 as described herein. The device 1705 may include a receiver 1710, a transmitter 1715, and a communications manager 1720. The device 1705 may also include a processor. Each of these components may be in communication with one another (e.g., via one or more buses).

The receiver 1710 may provide a means for receiving information such as packets, user data, control information, or any combination thereof associated with various information channels (e.g., control channels, data channels, information channels related to codebook-based sounding reference signal and precoding matrix indicator configurations). Information may be passed on to other components of the device 1705. The receiver 1710 may utilize a single antenna or a set of multiple antennas.

The transmitter 1715 may provide a means for transmitting signals generated by other components of the device 1705. For example, the transmitter 1715 may transmit information such as packets, user data, control information, or any combination thereof associated with various information channels (e.g., control channels, data channels, information channels related to codebook-based sounding reference signal and precoding matrix indicator configurations). In some examples, the transmitter 1715 may be co-located with a receiver 1710 in a transceiver module. The transmitter 1715 may utilize a single antenna or a set of multiple antennas.

The device 1705, or various components thereof, may be an example of means for performing various aspects of codebook-based sounding reference signal and precoding matrix indicator configurations as described herein. For example, the communications manager 1720 may include a capability information manager 1725, an SRS resource mapping manager 1730, an uplink grant manager 1735, an SRS manager 1740, or any combination thereof. The communications manager 1720 may be an example of aspects of a communications manager 1620 as described herein. In some examples, the communications manager 1720, or various components thereof, may be configured to perform various operations (e.g., receiving, monitoring, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to receive information, transmit information, or perform various other operations as described herein.

The communications manager 1720 may support wireless communications at a base station in accordance with examples as disclosed herein. The capability information manager 1725 may be configured as or otherwise support a means for receiving, from a UE, a message indicating that the UE is capable of supporting multiple sounding reference signal resources in one sounding reference signal resource set associated with differing numbers of antenna ports. The SRS resource mapping manager 1730 may be configured as or otherwise support a means for transmitting, to the UE, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set. The uplink grant manager 1735 may be configured as or otherwise support a means for transmitting, to the UE, an uplink grant indicating a sounding reference signal resource index corresponding to the first sounding reference signal resource. The SRS manager 1740 may be configured as or otherwise support a means for receiving, via the first sounding reference signal resource, a set of multiple sounding reference signals via the first number of antenna ports using the first number of transmit chains.

Additionally, or alternatively, the communications manager 1720 may support wireless communications at a base station in accordance with examples as disclosed herein. The capability information manager 1725 may be configured as or otherwise support a means for receiving, from a UE, a message indicating that the UE is capable of supporting multiple sounding reference signal resources in one sounding reference signal resource set associated with differing numbers of antenna ports. The SRS resource mapping manager 1730 may be configured as or otherwise support a means for transmitting, to the UE, control signaling indicating a first mapping of a first number of one or more antenna ports to a first sounding reference signal resource of a set of multiple sounding reference signal resources of a sounding reference signal resource set. The uplink grant manager 1735 may be configured as or otherwise support a means for transmitting, to the UE, an uplink grant indicating a sounding reference signal resource index corresponding to the first sounding reference signal resource and indicating a precoding matrix indicator corresponding to a first number of transmit chains. The SRS manager 1740 may be configured as or otherwise support a means for receiving, via the first sounding reference signal resource and in accordance with the precoding matrix indicator, a set of multiple sounding reference signals via the first number of one or more antenna ports using the first number of transmit chains.

Figure 18:
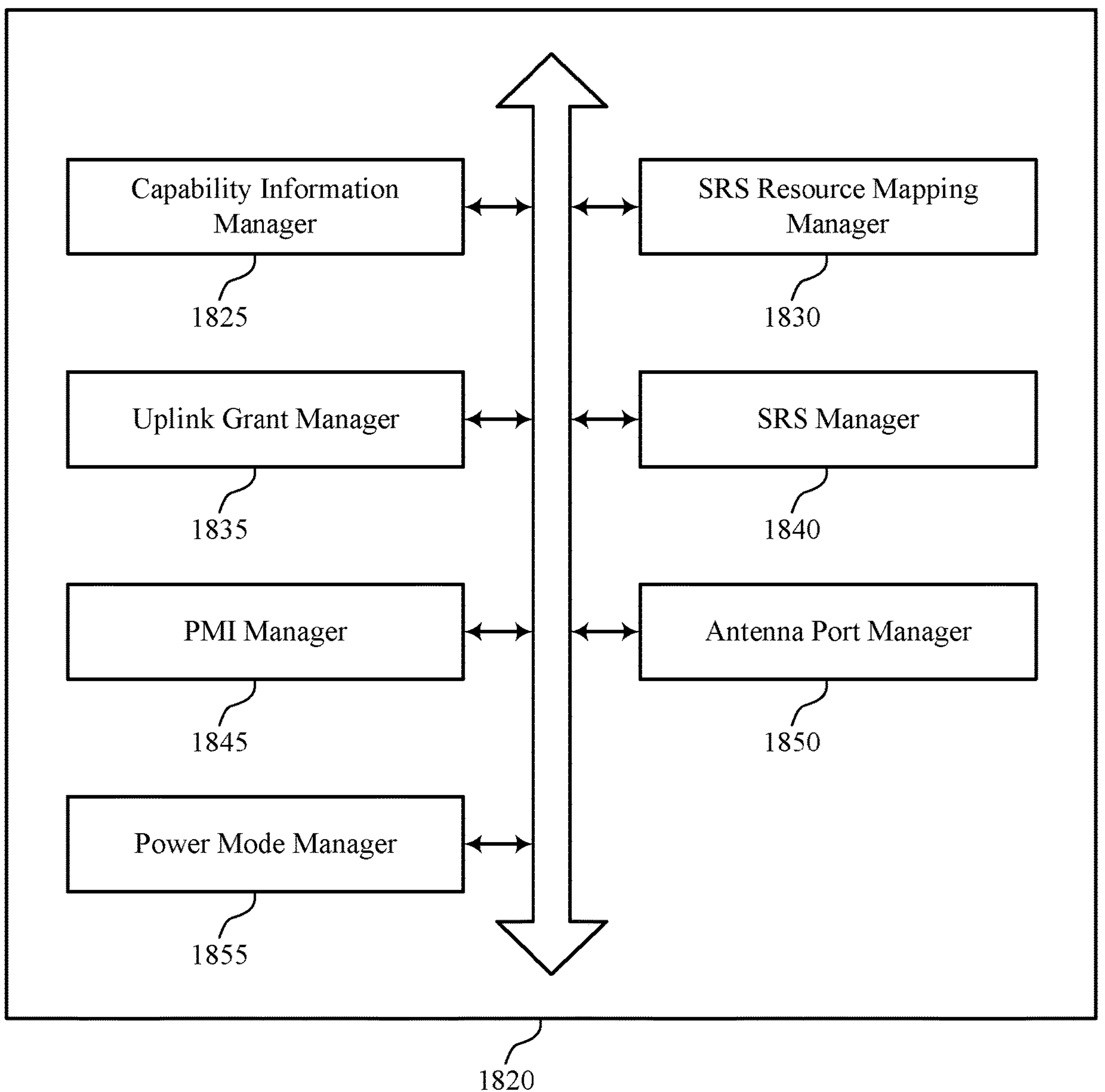
FIG. 18 shows a block diagram of a communications manager that supports codebook-based sounding reference signal and precoding matrix indicator configurations in accordance with aspects of the present disclosure.

FIG. 18 shows a block diagram 1800 of a communications manager 1820 that supports codebook-based sounding reference signal and precoding matrix indicator configurations in accordance with aspects of the present disclosure. The communications manager 1820 may be an example of aspects of a communications manager 1620, a communications manager 1720, or both, as described herein. The communications manager 1820, or various components thereof, may be an example of means for performing various aspects of codebook-based sounding reference signal and precoding matrix indicator configurations as described herein. For example, the communications manager 1820 may include a capability information manager 1825, an SRS resource mapping manager 1830, an uplink grant manager 1835, an SRS manager 1840, a PMI manager 1845, an antenna port manager 1850, a power mode manager 1855, or any combination thereof. Each of these components may communicate, directly or indirectly, with one another (e.g., via one or more buses).

The communications manager 1820 may support wireless communications at a base station in accordance with examples as disclosed herein. The capability information manager 1825 may be configured as or otherwise support a means for receiving, from a UE, a message indicating that the UE is capable of supporting multiple sounding reference signal resources in one sounding reference signal resource set associated with differing numbers of antenna ports. The SRS resource mapping manager 1830 may be configured as or otherwise support a means for transmitting, to the UE, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set. The uplink grant manager 1835 may be configured as or otherwise support a means for transmitting, to the UE, an uplink grant indicating a sounding reference signal resource index corresponding to the first sounding reference signal resource. The SRS manager 1840 may be configured as or otherwise support a means for receiving, via the first sounding reference signal resource, a set of multiple sounding reference signals via the first number of antenna ports using the first number of transmit chains.

In some examples, to support transmitting the control signaling, the SRS resource mapping manager 1830 may be configured as or otherwise support a means for transmitting the control signaling indicating a mapping of the first number of transmit chains to the second sounding reference signal resource of the sounding reference signal resource set.

In some examples, to support transmitting the control signaling, the SRS resource mapping manager 1830 may be configured as or otherwise support a means for transmitting the control signaling indicating a mapping of a second number of transmit chains to the second sounding reference signal resource of the sounding reference signal resource set.

In some examples, to support transmitting the uplink grant, the PMI manager 1845 may be configured as or otherwise support a means for transmitting a downlink control information message including the uplink grant and an indication of a precoding matrix indicator for transmitting the set of multiple sounding reference signal.

In some examples, the PMI manager 1845 may be configured as or otherwise support a means for transmitting, to the UE, control signaling indicating a set of precoding matrix indicators, where the indication of the precoding matrix indicator is one of the set of precoding matrix indicators.

In some examples, to support receiving the set of multiple sounding reference signals, the SRS manager 1840 may be configured as or otherwise support a means for receiving the set of multiple sounding reference signals on a single component carrier.

In some examples, the antenna port manager 1850 may be configured as or otherwise support a means for transmitting, to the UE, an indication to use three antenna ports for transmissions on a single component carrier supporting a second number of transmit chains, where the second number of transmit chains includes three transmit chains.

In some examples, the first number of transmit chains is two transmit chains and a second number of transmit chains is three transmit chains. In some examples, the first number of transmit chains is three transmit chains and the second number of transmit chains is two transmit chains.

Additionally, or alternatively, the communications manager 1820 may support wireless communications at a base station in accordance with examples as disclosed herein. In some examples, the capability information manager 1825 may be configured as or otherwise support a means for receiving, from a UE, a message indicating that the UE is capable of supporting multiple sounding reference signal resources in one sounding reference signal resource set associated with differing numbers of antenna ports. In some examples, the SRS resource mapping manager 1830 may be configured as or otherwise support a means for transmitting, to the UE, control signaling indicating a first mapping of a first number of one or more antenna ports to a first sounding reference signal resource of a set of multiple sounding reference signal resources of a sounding reference signal resource set. In some examples, the uplink grant manager 1835 may be configured as or otherwise support a means for transmitting, to the UE, an uplink grant indicating a sounding reference signal resource index corresponding to the first sounding reference signal resource and indicating a precoding matrix indicator corresponding to a first number of transmit chains. In some examples, the SRS manager 1840 may be configured as or otherwise support a means for receiving, via the first sounding reference signal resource and in accordance with the precoding matrix indicator, a set of multiple sounding reference signals via the first number of one or more antenna ports using the first number of transmit chains.

In some examples, to support transmitting the uplink grant, the power mode manager 1855 may be configured as or otherwise support a means for transmitting the uplink grant indicating that a power mode is disabled and the precoding matrix indicator that indicates a vector including a number of non-zero coefficients corresponding to the first number of transmit chains.

In some examples, to support transmitting the uplink grant, the power mode manager 1855 may be configured as or otherwise support a means for transmitting the uplink grant indicating that a power mode is enabled and that the precoding matrix indicator indicates a vector including a number of non-zero coefficients that is fewer than the first number of transmit chains, where multiple transmit chains of the first number of transmit chains transmit multiple sounding reference signals of the set of multiple sounding reference signals via a same antenna port of the first number of one or more antenna ports.

In some examples, the SRS resource mapping manager 1830 may be configured as or otherwise support a means for transmitting, to the UE, control signaling indicating a first mapping of the first number of transmit chains to a first set of precoding matrix indicators including the first precoding matrix indicator, and a second mapping of a second number of transmit chains to a second set of precoding matrix indicators.

Figure 19:
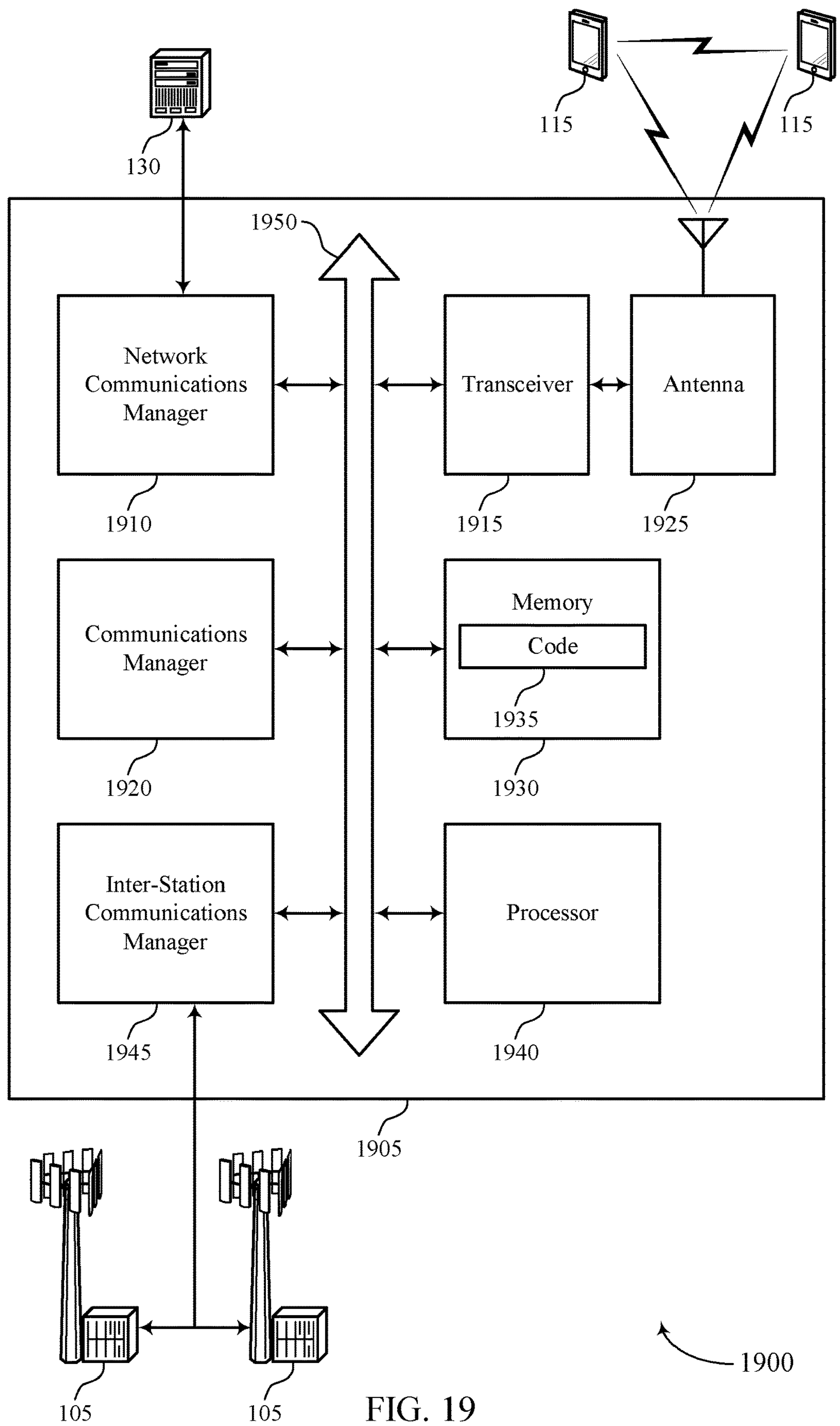
FIG. 19 shows a diagram of a system including a device that supports codebook-based sounding reference signal and precoding matrix indicator configurations in accordance with aspects of the present disclosure.

FIG. 19 shows a diagram of a system 1900 including a device 1905 that supports codebook-based sounding reference signal and precoding matrix indicator configurations in accordance with aspects of the present disclosure. The device 1905 may be an example of or include the components of a device 1605, a device 1705, or a base station 105 as described herein. The device 1905 may communicate wirelessly with one or more base stations 105, UEs 115, or any combination thereof. The device 1905 may include components for bi-directional voice and data communications including components for transmitting and receiving communications, such as a communications manager 1920, a network communications manager 1910, a transceiver 1915, an antenna 1925, a memory 1930, code 1935, a processor 1940, and an inter-station communications manager 1945. These components may be in electronic communication or otherwise coupled (e.g., operatively, communicatively, functionally, electronically, electrically) via one or more buses (e.g., a bus 1950).

The network communications manager 1910 may manage communications with a core network 130 (e.g., via one or more wired backhaul links). For example, the network communications manager 1910 may manage the transfer of data communications for client devices, such as one or more UEs 115.

In some cases, the device 1905 may include a single antenna 1925. However, in some other cases the device 1905 may have more than one antenna 1925, which may be capable of concurrently transmitting or receiving multiple wireless transmissions. The transceiver 1915 may communicate bi-directionally, via the one or more antennas 1925, wired, or wireless links as described herein. For example, the transceiver 1915 may represent a wireless transceiver and may communicate bi-directionally with another wireless transceiver. The transceiver 1915 may also include a modem to modulate the packets, to provide the modulated packets to one or more antennas 1925 for transmission, and to demodulate packets received from the one or more antennas 1925. The transceiver 1915, or the transceiver 1915 and one or more antennas 1925, may be an example of a transmitter 1615, a transmitter 1715, a receiver 1610, a receiver 1710, or any combination thereof or component thereof, as described herein.

The memory 1930 may include RAM and ROM. The memory 1930 may store computer-readable, computer-executable code 1935 including instructions that, when executed by the processor 1940, cause the device 1905 to perform various functions described herein. The code 1935 may be stored in a non-transitory computer-readable medium such as system memory or another type of memory. In some cases, the code 1935 may not be directly executable by the processor 1940 but may cause a computer (e.g., when compiled and executed) to perform functions described herein. In some cases, the memory 1930 may contain, among other things, a BIOS which may control basic hardware or software operation such as the interaction with peripheral components or devices.

The processor 1940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting codebook-based sounding reference signal and precoding matrix indicator configurations). For example, the device 1905 or a component of the device 1905 may include a processor 1940 and memory 1930 coupled to the processor 1940, the processor 1940 and memory 1930 configured to perform various functions described herein.

The inter-station communications manager 1945 may manage communications with other base stations 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communications network technology to provide communication between base stations 105.

The communications manager 1920 may support wireless communications at a base station in accordance with examples as disclosed herein. For example, the communications manager 1920 may be configured as or otherwise support a means for receiving, from a UE, a message indicating that the UE is capable of supporting multiple sounding reference signal resources in one sounding reference signal resource set associated with differing numbers of antenna ports. The communications manager 1920 may be configured as or otherwise support a means for transmitting, to the UE, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set. The communications manager 1920 may be configured as or otherwise support a means for transmitting, to the UE, an uplink grant indicating a sounding reference signal resource index corresponding to the first sounding reference signal resource. The communications manager 1920 may be configured as or otherwise support a means for receiving, via the first sounding reference signal resource, a set of multiple sounding reference signals via the first number of antenna ports using the first number of transmit chains.

Additionally, or alternatively, the communications manager 1920 may support wireless communications at a base station in accordance with examples as disclosed herein. For example, the communications manager 1920 may be configured as or otherwise support a means for receiving, from a UE, a message indicating that the UE is capable of supporting multiple sounding reference signal resources in one sounding reference signal resource set associated with differing numbers of antenna ports. The communications manager 1920 may be configured as or otherwise support a means for transmitting, to the UE, control signaling indicating a first mapping of a first number of one or more antenna ports to a first sounding reference signal resource of a set of multiple sounding reference signal resources of a sounding reference signal resource set. The communications manager 1920 may be configured as or otherwise support a means for transmitting, to the UE, an uplink grant indicating a sounding reference signal resource index corresponding to the first sounding reference signal resource and indicating a precoding matrix indicator corresponding to a first number of transmit chains. The communications manager 1920 may be configured as or otherwise support a means for receiving, via the first sounding reference signal resource and in accordance with the precoding matrix indicator, a set of multiple sounding reference signals via the first number of one or more antenna ports using the first number of transmit chains.

By including or configuring the communications manager 1920 in accordance with examples as described herein, the device 1905 may support techniques for transmit chain switching, which may result in increased throughput, more efficient use of available computational and wireless resources, decreased thermal costs at the UE, decreased system latency, and improved user experience.

In some examples, the communications manager 1920 may be configured to perform various operations (e.g., receiving, monitoring, transmitting) using or otherwise in cooperation with the transceiver 1915, the one or more antennas 1925, or any combination thereof. Although the communications manager 1920 is illustrated as a separate component, in some examples, one or more functions described with reference to the communications manager 1920 may be supported by or performed by the processor 1940, the memory 1930, the code 1935, or any combination thereof. For example, the code 1935 may include instructions executable by the processor 1940 to cause the device 1905 to perform various aspects of codebook-based sounding reference signal and precoding matrix indicator configurations as described herein, or the processor 1940 and the memory 1930 may be otherwise configured to perform or support such operations.

Figure 20:
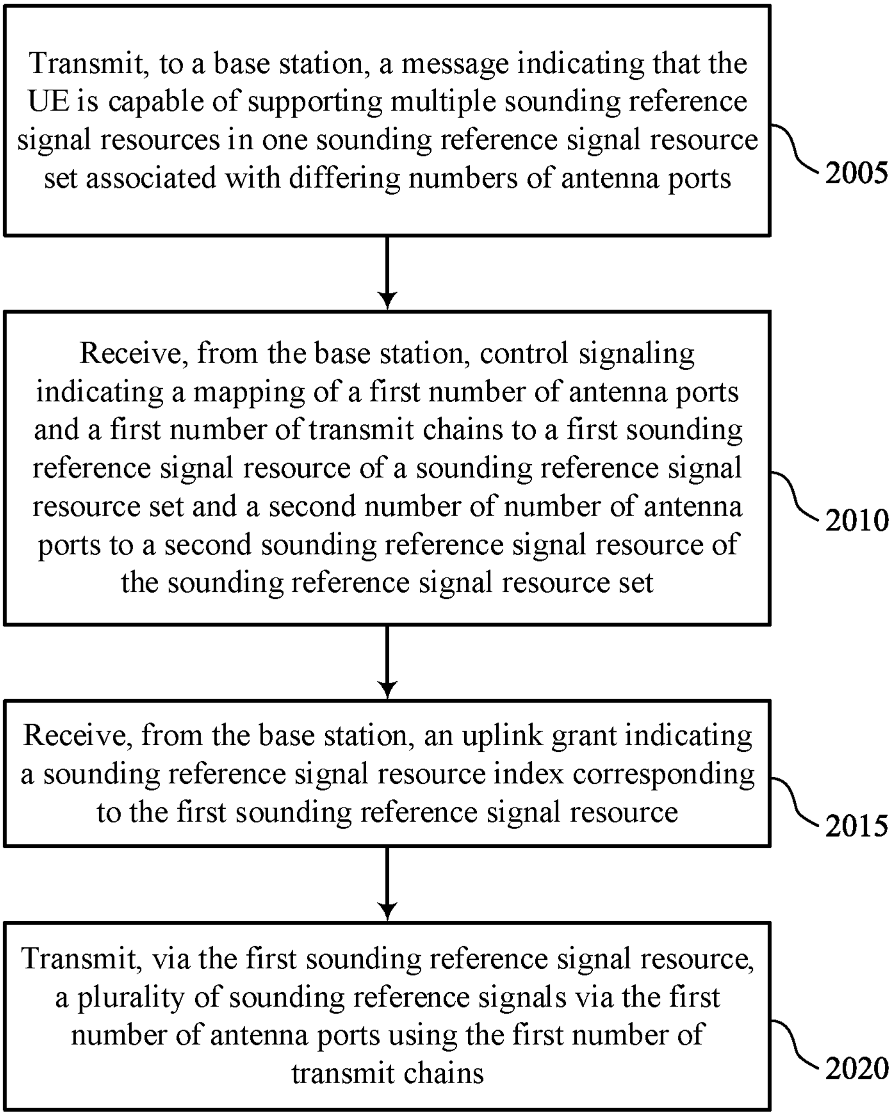
FIGS. 20 through 23 show flowcharts illustrating methods that support codebook-based sounding reference signal and precoding matrix indicator configurations in accordance with aspects of the present disclosure.

FIG. 20 shows a flowchart illustrating a method 2000 that supports codebook-based sounding reference signal and precoding matrix indicator configurations in accordance with aspects of the present disclosure. The operations of the method 2000 may be implemented by a UE or its components as described herein. For example, the operations of the method 2000 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 2005, the method may include transmitting, to a base station, a message indicating that the UE is capable of supporting multiple sounding reference signal resources in one sounding reference signal resource set associated with differing numbers of antenna ports. The operations of 2005 may be performed in accordance with examples as disclosed herein. In some examples, aspects of the operations of 2005 may be performed by a capability information manager 1425 as described with reference to FIG. 14.

At 2010, the method may include receiving, from the base station, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set. The operations of 2010 may be performed in accordance with examples as disclosed herein. In some examples, aspects of the operations of 2010 may be performed by an SRS resource mapping manager 1430 as described with reference to FIG. 14.

At 2015, the method may include receiving, from the base station, an uplink grant indicating a sounding reference signal resource index corresponding to the first sounding reference signal resource. The operations of 2015 may be performed in accordance with examples as disclosed herein. In some examples, aspects of the operations of 2015 may be performed by an uplink grant manager 1435 as described with reference to FIG. 14.

At 2020, the method may include transmitting, via the first sounding reference signal resource, a set of multiple sounding reference signals via the first number of antenna ports using the first number of transmit chains. The operations of 2020 may be performed in accordance with examples as disclosed herein. In some examples, aspects of the operations of 2020 may be performed by an SRS manager 1440 as described with reference to FIG. 14.

Figure 21:
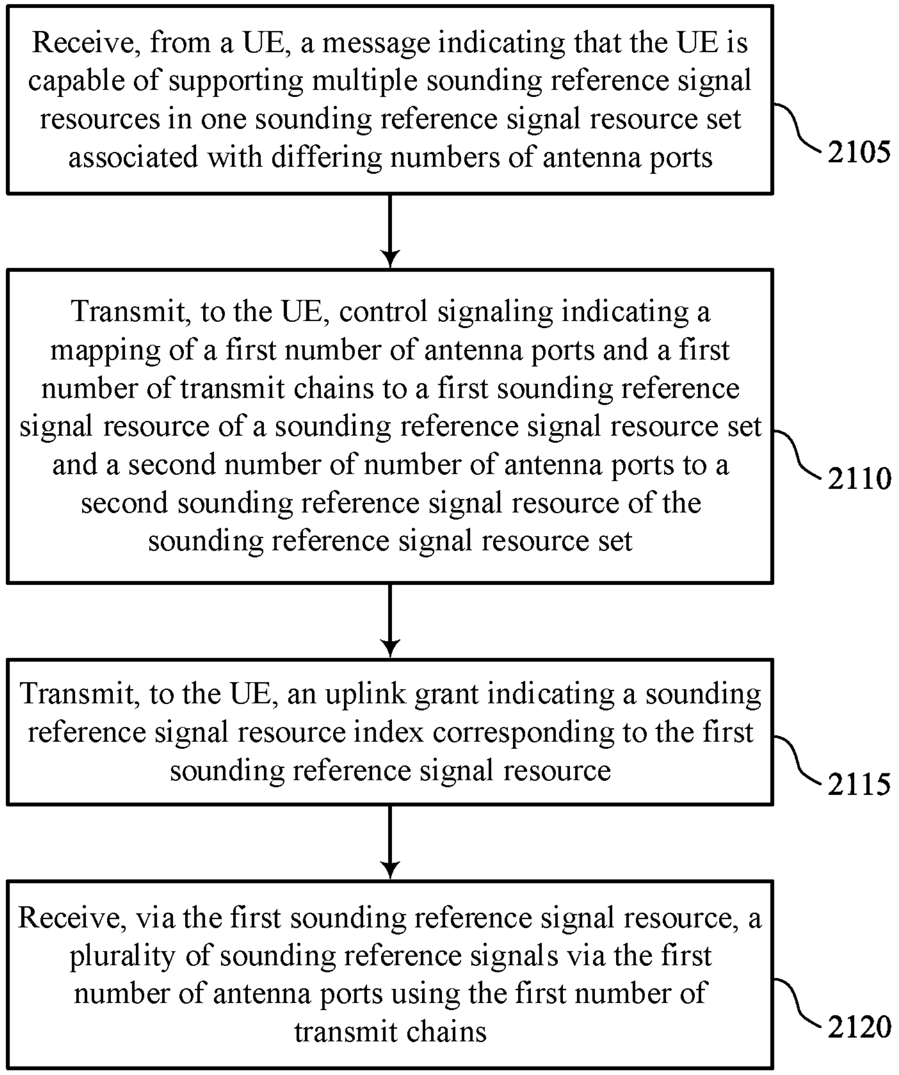

FIG. 21 shows a flowchart illustrating a method 2100 that supports codebook-based sounding reference signal and precoding matrix indicator configurations in accordance with aspects of the present disclosure. The operations of the method 2100 may be implemented by a base station or its components as described herein. For example, the operations of the method 2100 may be performed by a base station 105 as described with reference to FIGS. 1 through 11 and 16 through 19. In some examples, a base station may execute a set of instructions to control the functional elements of the base station to perform the described functions. Additionally, or alternatively, the base station may perform aspects of the described functions using special-purpose hardware.

At 2105, the method may include receiving, from a UE, a message indicating that the UE is capable of supporting multiple sounding reference signal resources in one sounding reference signal resource set associated with differing numbers of antenna ports. The operations of 2105 may be performed in accordance with examples as disclosed herein. In some examples, aspects of the operations of 2105 may be performed by a capability information manager 1825 as described with reference to FIG. 18.

At 2110, the method may include transmitting, to the UE, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set. The operations of 2110 may be performed in accordance with examples as disclosed herein. In some examples, aspects of the operations of 2110 may be performed by an SRS resource mapping manager 1830 as described with reference to FIG. 18.

At 2115, the method may include transmitting, to the UE, an uplink grant indicating a sounding reference signal resource index corresponding to the first sounding reference signal resource. The operations of 2115 may be performed in accordance with examples as disclosed herein. In some examples, aspects of the operations of 2115 may be performed by an uplink grant manager 1835 as described with reference to FIG. 18.

At 2120, the method may include receiving, via the first sounding reference signal resource, a set of multiple sounding reference signals via the first number of antenna ports using the first number of transmit chains. The operations of 2120 may be performed in accordance with examples as disclosed herein. In some examples, aspects of the operations of 2120 may be performed by an SRS manager 1840 as described with reference to FIG. 18.

Figure 22:
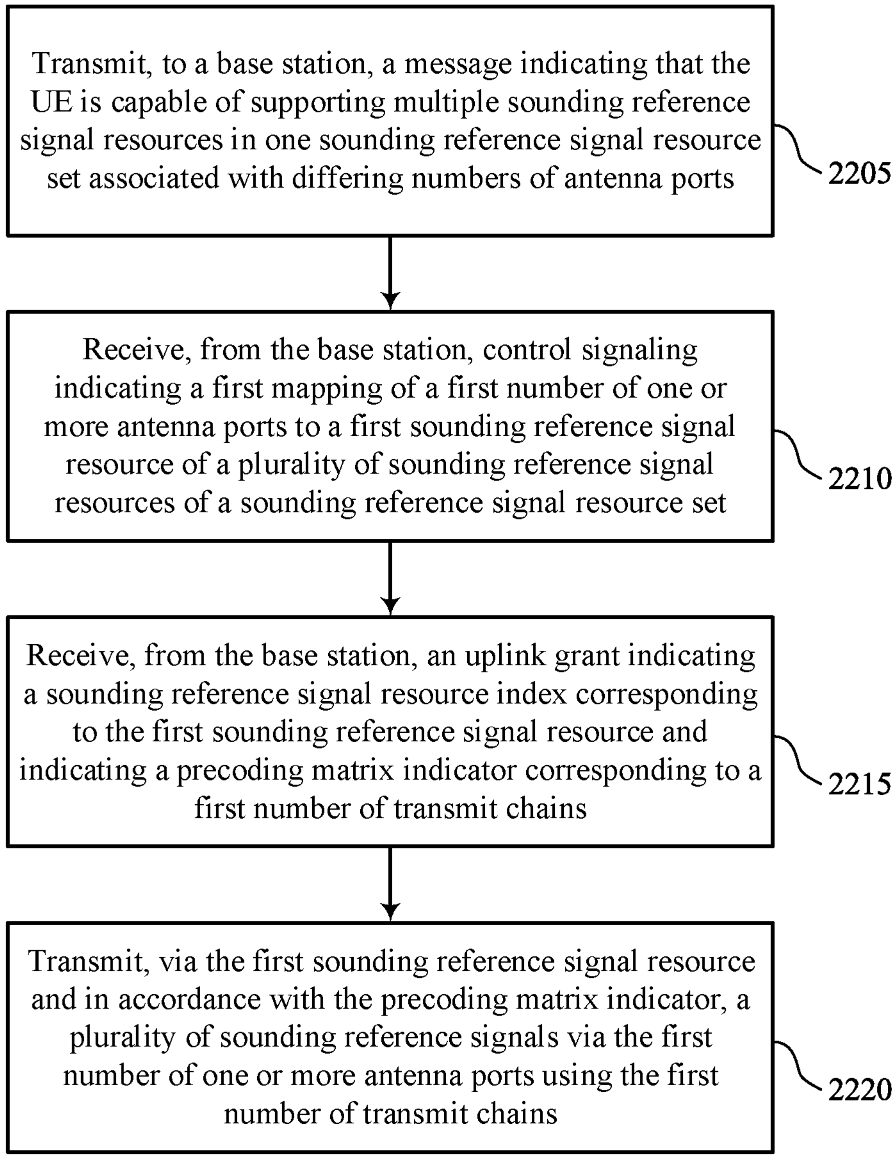

FIG. 22 shows a flowchart illustrating a method 2200 that supports codebook-based sounding reference signal and precoding matrix indicator configurations in accordance with aspects of the present disclosure. The operations of the method 2200 may be implemented by a UE or its components as described herein. For example, the operations of the method 2200 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 2205, the method may include transmitting, to a base station, a message indicating that the UE is capable of supporting multiple sounding reference signal resources in one sounding reference signal resource set associated with differing numbers of antenna ports. The operations of 2205 may be performed in accordance with examples as disclosed herein. In some examples, aspects of the operations of 2205 may be performed by a capability information manager 1425 as described with reference to FIG. 14.

At 2210, the method may include receiving, from the base station, control signaling indicating a first mapping of a first number of one or more antenna ports to a first sounding reference signal resource of a set of multiple sounding reference signal resources of a sounding reference signal resource set. The operations of 2210 may be performed in accordance with examples as disclosed herein. In some examples, aspects of the operations of 2210 may be performed by an SRS resource mapping manager 1430 as described with reference to FIG. 14.

At 2215, the method may include receiving, from the base station, an uplink grant indicating a sounding reference signal resource index corresponding to the first sounding reference signal resource and indicating a precoding matrix indicator corresponding to a first number of transmit chains. The operations of 2215 may be performed in accordance with examples as disclosed herein. In some examples, aspects of the operations of 2215 may be performed by an uplink grant manager 1435 as described with reference to FIG. 14.

At 2220, the method may include transmitting, via the first sounding reference signal resource and in accordance with the precoding matrix indicator, a set of multiple sounding reference signals via the first number of one or more antenna ports using the first number of transmit chains. The operations of 2220 may be performed in accordance with examples as disclosed herein. In some examples, aspects of the operations of 2220 may be performed by an SRS manager 1440 as described with reference to FIG. 14.

Figure 23:
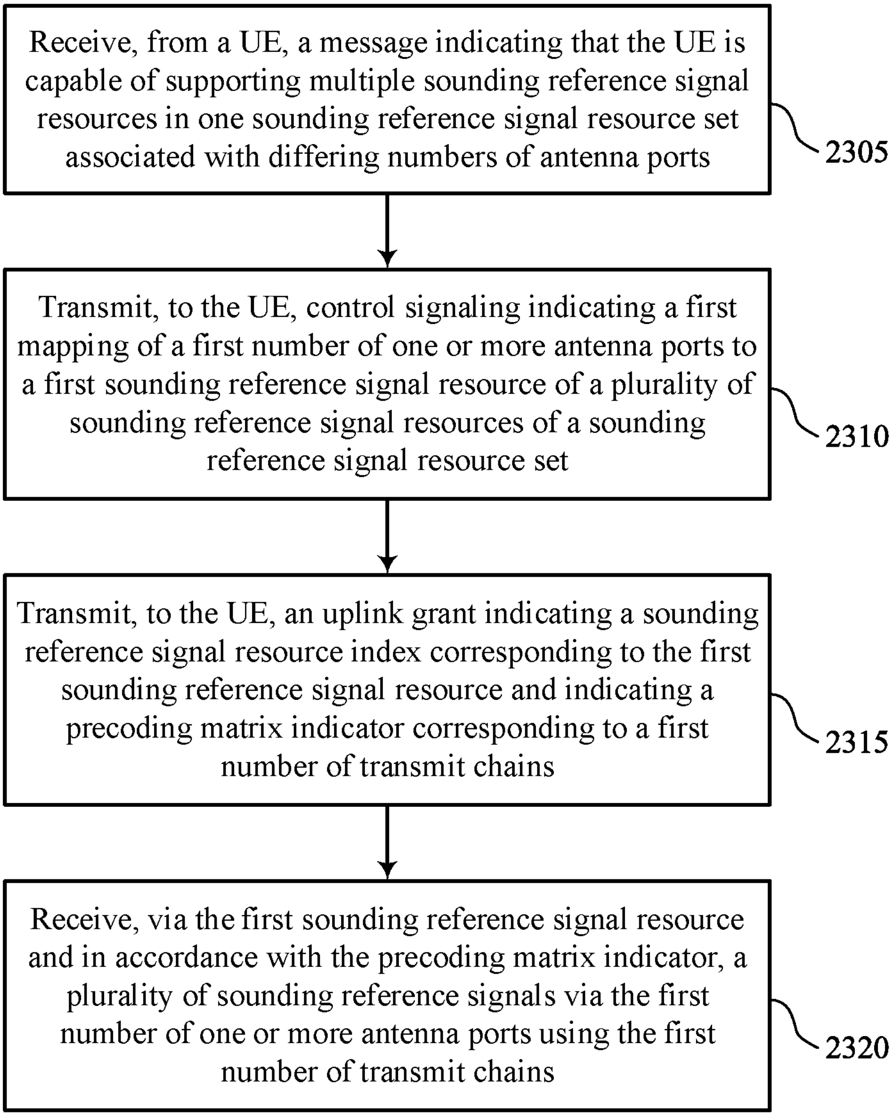

FIG. 23 shows a flowchart illustrating a method 2300 that supports codebook-based sounding reference signal and precoding matrix indicator configurations in accordance with aspects of the present disclosure. The operations of the method 2300 may be implemented by a base station or its components as described herein. For example, the operations of the method 2300 may be performed by a base station 105 as described with reference to FIGS. 1 through 11 and 16 through 19. In some examples, a base station may execute a set of instructions to control the functional elements of the base station to perform the described functions. Additionally, or alternatively, the base station may perform aspects of the described functions using special-purpose hardware.

At 2305, the method may include receiving, from a UE, a message indicating that the UE is capable of supporting multiple sounding reference signal resources in one sounding reference signal resource set associated with differing numbers of antenna ports. The operations of 2305 may be performed in accordance with examples as disclosed herein. In some examples, aspects of the operations of 2305 may be performed by a capability information manager 1825 as described with reference to FIG. 18.

At 2310, the method may include transmitting, to the UE, control signaling indicating a first mapping of a first number of one or more antenna ports to a first sounding reference signal resource of a set of multiple sounding reference signal resources of a sounding reference signal resource set. The operations of 2310 may be performed in accordance with examples as disclosed herein. In some examples, aspects of the operations of 2310 may be performed by an SRS resource mapping manager 1830 as described with reference to FIG. 18.

At 2315, the method may include transmitting, to the UE, an uplink grant indicating a sounding reference signal resource index corresponding to the first sounding reference signal resource and indicating a precoding matrix indicator corresponding to a first number of transmit chains. The operations of 2315 may be performed in accordance with examples as disclosed herein. In some examples, aspects of the operations of 2315 may be performed by an uplink grant manager 1835 as described with reference to FIG. 18.

At 2320, the method may include receiving, via the first sounding reference signal resource and in accordance with the precoding matrix indicator, a set of multiple sounding reference signals via the first number of one or more antenna ports using the first number of transmit chains. The operations of 2320 may be performed in accordance with examples as disclosed herein. In some examples, aspects of the operations of 2320 may be performed by an SRS manager 1840 as described with reference to FIG. 18.

The following provides an overview of aspects of the present disclosure:

Aspect 1: A method for wireless communications at a UE, comprising: transmitting, to a base station, a message indicating that the UE is capable of supporting multiple sounding reference signal resources in one sounding reference signal resource set associated with differing numbers of antenna ports; receiving, from the base station, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set; receiving, from the base station, an uplink grant indicating a sounding reference signal resource index corresponding to the first sounding reference signal resource; and transmitting, via the first sounding reference signal resource, a plurality of sounding reference signals via the first number of antenna ports using the first number of transmit chains.

Aspect 2: The method of aspect 1, wherein receiving the control signaling comprises: receiving the control signaling indicating a mapping of the first number of transmit chains to the second sounding reference signal resource of the sounding reference signal resource set.

Aspect 3: The method of any of aspects 1 through 2, wherein receiving the control signaling comprises: receiving the control signaling indicating a mapping of a second number of transmit chains to the second sounding reference signal resource of the sounding reference signal resource set.

Aspect 4: The method of any of aspects 1 through 3, wherein receiving the uplink grant comprises: receiving a downlink control information message comprising the uplink grant and an indication of a precoding matrix indicator for transmitting the plurality of sounding reference signal.

Aspect 5: The method of aspect 4, further comprising: precoding the plurality of sounding reference signals according to the precoding matrix indicator, wherein transmitting the plurality of sounding reference signals is based at least in part on the precoding.

Aspect 6: The method of any of aspects 4 through 5, further comprising: receiving, from the base station, control signaling indicating a set of precoding matrix indicators, wherein the indication of the precoding matrix indicator is one of the set of precoding matrix indicators.

Aspect 7: The method of any of aspects 1 through 6, wherein transmitting the plurality of sounding reference signals comprises: transmitting the plurality of sounding reference signals on a single component carrier.

Aspect 8: The method of any of aspects 1 through 7, further comprising: receiving, from the base station, an indication to use three antenna ports for transmissions on a single component carrier supporting a second number of transmit chains, wherein the second number of transmit chains comprises three transmit chains.

Aspect 9: The method of any of aspects 1 through 8, wherein, the first number of transmit chains is two transmit chains and a second number of transmit chains is three transmit chains Aspect 10: The method of any of aspects 1 through 9, wherein, the first number of transmit chains is three transmit chains and the second number of transmit chains is two transmit chains Aspect 11: A method for wireless communications at a base station, comprising: receiving, from a UE, a message indicating that the UE is capable of supporting multiple sounding reference signal resources in one sounding reference signal resource set associated with differing numbers of antenna ports; transmitting, to the UE, control signaling indicating a mapping of a first number of antenna ports and a first number of transmit chains to a first sounding reference signal resource of a sounding reference signal resource set and a second number of number of antenna ports to a second sounding reference signal resource of the sounding reference signal resource set; transmitting, to the UE, an uplink grant indicating a sounding reference signal resource index corresponding to the first sounding reference signal resource; and receiving, via the first sounding reference signal resource, a plurality of sounding reference signals via the first number of antenna ports using the first number of transmit chains.

Aspect 12: The method of aspect 11, wherein transmitting the control signaling comprises: transmitting the control signaling indicating a mapping of the first number of transmit chains to the second sounding reference signal resource of the sounding reference signal resource set.

Aspect 13: The method of any of aspects 11 through 12, wherein transmitting the control signaling comprises: transmitting the control signaling indicating a mapping of a second number of transmit chains to the second sounding reference signal resource of the sounding reference signal resource set.

Aspect 14: The method of any of aspects 11 through 13, wherein transmitting the uplink grant comprises: transmitting a downlink control information message comprising the uplink grant and an indication of a precoding matrix indicator for transmitting the plurality of sounding reference signal.

Aspect 15: The method of aspect 14, further comprising: transmitting, to the UE, control signaling indicating a set of precoding matrix indicators, wherein the indication of the precoding matrix indicator is one of the set of precoding matrix indicators.

Aspect 16: The method of any of aspects 11 through 15, wherein receiving the plurality of sounding reference signals comprises: receiving the plurality of sounding reference signals on a single component carrier.

Aspect 17: The method of any of aspects 11 through 16, further comprising: transmitting, to the UE, an indication to use three antenna ports for transmissions on a single component carrier supporting a second number of transmit chains, wherein the second number of transmit chains comprises three transmit chains.

Aspect 18: The method of any of aspects 11 through 17, wherein, the first number of transmit chains is two transmit chains and a second number of transmit chains is three transmit chains Aspect 19: The method of any of aspects 11 through 18, wherein, the first number of transmit chains is three transmit chains and the second number of transmit chains is two transmit chains Aspect 20: A method for wireless communications at a UE, comprising: transmitting, to a base station, a message indicating that the UE is capable of supporting multiple sounding reference signal resources in one sounding reference signal resource set associated with differing numbers of antenna ports; receiving, from the base station, control signaling indicating a first mapping of a first number of one or more antenna ports to a first sounding reference signal resource of a plurality of sounding reference signal resources of a sounding reference signal resource set; receiving, from the base station, an uplink grant indicating a sounding reference signal resource index corresponding to the first sounding reference signal resource and indicating a precoding matrix indicator corresponding to a first number of transmit chains; and transmitting, via the first sounding reference signal resource and in accordance with the precoding matrix indicator, a plurality of sounding reference signals via the first number of one or more antenna ports using the first number of transmit chains.

Aspect 21: The method of aspect 20, wherein receiving the uplink grant comprises: receiving the uplink grant indicating that a power mode is disabled and the precoding matrix indicator that indicates a vector comprising a number of non-zero coefficients corresponding to the first number of transmit chains.

Aspect 22: The method of any of aspects 20 through 21, wherein receiving the uplink grant comprises: receiving the uplink grant indicating that a power mode is enabled and that the precoding matrix indicator indicates a vector comprising a number of non-zero coefficients that is fewer than the first number of transmit chains.

Aspect 23: The method of aspect 22, wherein multiple transmit chains of the first number of transmit chains transmit multiple sounding reference signals of the plurality of sounding reference signals via a same antenna port of the first number of one or more antenna ports.

Aspect 24: The method of any of aspects 20 through 23, further comprising: receiving, from the base station, control signaling indicating a first mapping of the first number of transmit chains to a first set of precoding matrix indicators comprising the precoding matrix indicator, and a second mapping of a second number of transmit chains to a second set of precoding matrix indicators.

Aspect 25: The method of any of aspects 20 through 24, further comprising: selecting, based at least in part on the precoding matrix indicator, the first number of transmit chains from a set of candidate numbers of transmit chains.

Aspect 26: A method for wireless communications at a base station, comprising: receiving, from a UE, a message indicating that the UE is capable of supporting multiple sounding reference signal resources in one sounding reference signal resource set associated with differing numbers of antenna ports; transmitting, to the UE, control signaling indicating a first mapping of a first number of one or more antenna ports to a first sounding reference signal resource of a plurality of sounding reference signal resources of a sounding reference signal resource set; transmitting, to the UE, an uplink grant indicating a sounding reference signal resource index corresponding to the first sounding reference signal resource and indicating a precoding matrix indicator corresponding to a first number of transmit chains; and receiving, via the first sounding reference signal resource and in accordance with the precoding matrix indicator, a plurality of sounding reference signals via the first number of one or more antenna ports using the first number of transmit chains.

Aspect 27: The method of aspect 26, wherein transmitting the uplink grant comprises: transmitting the uplink grant indicating that a power mode is disabled and the precoding matrix indicator that indicates a vector comprising a number of non-zero coefficients corresponding to the first number of transmit chains.

Aspect 28: The method of any of aspects 26 through 27, wherein transmitting the uplink grant comprises: transmitting the uplink grant indicating that a power mode is enabled and that the precoding matrix indicator indicates a vector comprising a number of non-zero coefficients that is fewer than the first number of transmit chains.

Aspect 29: The method of aspect 28, wherein multiple transmit chains of the first number of transmit chains transmit multiple sounding reference signals of the plurality of sounding reference signals via a same antenna port of the first number of one or more antenna ports.

Aspect 30: The method of any of aspects 26 through 29, further comprising: transmitting, to the UE, control signaling indicating a first mapping of the first number of transmit chains to a first set of precoding matrix indicators comprising the precoding matrix indicator, and a second mapping of a second number of transmit chains to a second set of precoding matrix indicators.

Aspect 31: An apparatus for wireless communications at a UE, comprising a processor; memory coupled with the processor; and instructions stored in the memory and executable by the processor to cause the apparatus to perform a method of any of aspects 1 through 10.

Aspect 32: An apparatus for wireless communications at a UE, comprising at least one means for performing a method of any of aspects 1 through 10.

Aspect 33: A non-transitory computer-readable medium storing code for wireless communications at a UE, the code comprising instructions executable by a processor to perform a method of any of aspects 1 through 10.

Aspect 34: An apparatus for wireless communications at a base station, comprising a processor; memory coupled with the processor; and instructions stored in the memory and executable by the processor to cause the apparatus to perform a method of any of aspects 11 through 19.

Aspect 35: An apparatus for wireless communications at a base station, comprising at least one means for performing a method of any of aspects 11 through 19.

Aspect 36: A non-transitory computer-readable medium storing code for wireless communications at a base station, the code comprising instructions executable by a processor to perform a method of any of aspects 11 through 19.

Aspect 37: An apparatus for wireless communications at a UE, comprising a processor; memory coupled with the processor; and instructions stored in the memory and executable by the processor to cause the apparatus to perform a method of any of aspects 20 through 25.

Aspect 38: An apparatus for wireless communications at a UE, comprising at least one means for performing a method of any of aspects 20 through 25.

Aspect 39: A non-transitory computer-readable medium storing code for wireless communications at a UE, the code comprising instructions executable by a processor to perform a method of any of aspects 20 through 25.

Aspect 40: An apparatus for wireless communications at a base station, comprising a processor; memory coupled with the processor; and instructions stored in the memory and executable by the processor to cause the apparatus to perform a method of any of aspects 26 through 30.

Aspect 41: An apparatus for wireless communications at a base station, comprising at least one means for performing a method of any of aspects 26 through 30.

Aspect 42: A non-transitory computer-readable medium storing code for wireless communications at a base station, the code comprising instructions executable by a processor to perform a method of any of aspects 26 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
- transmitting, to a base station, a message indicating that the UE is capable of supporting multiple sounding reference signal resources in one sounding reference signal resource set associated with differing numbers of antenna ports;
- receiving, from the base station, control signaling indicating a mapping of a first number of antenna ports and a first number of transmit chains to a first sounding reference signal resource of a sounding reference signal resource set and of a second number of antenna ports and a second number of transmit chains to a second sounding reference signal resource of the sounding reference signal resource set, wherein the first number of transmit chains is different from the second number of transmit chains;
- receiving, from the base station, an uplink grant indicating a sounding reference signal resource index corresponding to the first sounding reference signal resource; and
- transmitting, via the first sounding reference signal resource, a plurality of sounding reference signals via the first number of antenna ports using the first number of transmit chains.

2. The method of claim 1, wherein receiving the uplink grant comprises:
- receiving a downlink control information message comprising the uplink grant and an indication of a precoding matrix indicator for transmitting the plurality of sounding reference signals.

3. The method of claim 2, further comprising:
- precoding the plurality of sounding reference signals according to the precoding matrix indicator, wherein transmitting the plurality of sounding reference signals is based at least in part on the precoding.

4. The method of claim 2, further comprising:
- receiving, from the base station, control signaling indicating a set of precoding matrix indicators, wherein the indication of the precoding matrix indicator is one of the set of precoding matrix indicators.

5. The method of claim 1, wherein transmitting the plurality of sounding reference signals comprises:
- transmitting the plurality of sounding reference signals on a single component carrier.

6. The method of claim 1, further comprising:
- receiving, from the base station, an indication to use three antenna ports for transmissions on a single component carrier supporting the second number of transmit chains, wherein the second number of transmit chains comprises three transmit chains.

7. The method of claim 1, wherein the first number of transmit chains is two transmit chains and the second number of transmit chains is three transmit chains.

8. The method of claim 1, wherein the first number of transmit chains is three transmit chains and the second number of transmit chains is two transmit chains.

9. A method for wireless communications at a base station, comprising:
- receiving, from a user equipment (UE), a message indicating that the UE is capable of supporting multiple sounding reference signal resources in one sounding reference signal resource set associated with differing numbers of antenna ports;
- transmitting, to the UE, control signaling indicating a mapping of a first number of antenna ports and a first number of transmit chains to a first sounding reference signal resource of a sounding reference signal resource set and of a second number of antenna ports and a second number of transmit chains to a second sounding reference signal resource of the sounding reference signal resource set, wherein the first number of transmit chains is different from the second number of transmit chains;
- transmitting, to the UE, an uplink grant indicating a sounding reference signal resource index corresponding to the first sounding reference signal resource; and
- receiving, via the first sounding reference signal resource, a plurality of sounding reference signals via the first number of antenna ports using the first number of transmit chains.

10. The method of claim 9, wherein transmitting the uplink grant comprises:
- transmitting a downlink control information message comprising the uplink grant and an indication of a precoding matrix indicator for transmitting the plurality of sounding reference signals.

11. The method of claim 10, further comprising:
- transmitting, to the UE, control signaling indicating a set of precoding matrix indicators, wherein the indication of the precoding matrix indicator is one of the set of precoding matrix indicators.

12. The method of claim 9, wherein receiving the plurality of sounding reference signals comprises:
- receiving the plurality of sounding reference signals on a single component carrier.

13. The method of claim 9, further comprising:
- transmitting, to the UE, an indication to use three antenna ports for transmissions on a single component carrier supporting the second number of transmit chains, wherein the second number of transmit chains comprises three transmit chains.

14. The method of claim 9, wherein the first number of transmit chains is two transmit chains and the second number of transmit chains is three transmit chains.

15. The method of claim 9, wherein the first number of transmit chains is three transmit chains and the second number of transmit chains is two transmit chains.

16. A method for wireless communications at a user equipment (UE), comprising:
- transmitting, to a base station, a message indicating that the UE is capable of supporting multiple sounding reference signal resources in one sounding reference signal resource set associated with differing numbers of antenna ports;
- receiving, from the base station, control signaling indicating a first mapping of a first number of one or more antenna ports to a first sounding reference signal resource of a plurality of sounding reference signal resources of a sounding reference signal resource set;

receiving, from the base station, an uplink grant indicating a sounding reference signal resource index corresponding to the first sounding reference signal resource and indicating a precoding matrix indicator corresponding to a first number of transmit chains; and transmitting, via the first sounding reference signal resource and in accordance with the precoding matrix indicator, a plurality of sounding reference signals via the first number of one or more antenna ports using the first number of transmit chains.

17. The method of claim 16, wherein receiving the uplink grant comprises:

receiving the uplink grant indicating that a power mode is disabled and the precoding matrix indicator that indicates a vector comprising a number of non-zero coefficients corresponding to the first number of transmit chains.

18. The method of claim 16, wherein receiving the uplink grant comprises:

receiving the uplink grant indicating that a power mode is enabled and that the precoding matrix indicator indicates a vector comprising a number of non-zero coefficients that is fewer than the first number of transmit chains.

19. The method of claim 18, wherein multiple transmit chains of the first number of transmit chains transmit multiple sounding reference signals of the plurality of sounding reference signals via a same antenna port of the first number of one or more antenna ports.

20. The method of claim 16, further comprising:

receiving, from the base station, control signaling indicating a first mapping of the first number of transmit chains to a first set of precoding matrix indicators comprising the precoding matrix indicator, and a second mapping of a second number of transmit chains to a second set of precoding matrix indicators.

21. The method of claim 16, further comprising:

selecting, based at least in part on the precoding matrix indicator, the first number of transmit chains from a set of candidate numbers of transmit chains.

22. A method for wireless communications at a base station, comprising:

receiving, from a user equipment (UE), a message indicating that the UE is capable of supporting multiple sounding reference signal resources in one sounding reference signal resource set associated with differing numbers of antenna ports;

transmitting, to the UE, control signaling indicating a first mapping of a first number of one or more antenna ports to a first sounding reference signal resource of a plurality of sounding reference signal resources of a sounding reference signal resource set;

transmitting, to the UE, an uplink grant indicating a sounding reference signal resource index corresponding to the first sounding reference signal resource and indicating a precoding matrix indicator corresponding to a first number of transmit chains; and receiving, via the first sounding reference signal resource and in accordance with the precoding matrix indicator, a plurality of sounding reference signals via the first number of one or more antenna ports using the first number of transmit chains.

23. The method of claim 22, wherein transmitting the uplink grant comprises:

transmitting the uplink grant indicating that a power mode is disabled and the precoding matrix indicator that indicates a vector comprising a number of non-zero coefficients corresponding to the first number of transmit chains.

24. The method of claim 22, wherein transmitting the uplink grant comprises:

transmitting the uplink grant indicating that a power mode is enabled and that the precoding matrix indicator indicates a vector comprising a number of non-zero coefficients that is fewer than the first number of transmit chains.

25. The method of claim 24, wherein multiple transmit chains of the first number of transmit chains transmit multiple sounding reference signals of the plurality of sounding reference signals via a same antenna port of the first number of one or more antenna ports.

26. The method of claim 22, further comprising:

transmitting, to the UE, control signaling indicating a first mapping of the first number of transmit chains to a first set of precoding matrix indicators comprising the precoding matrix indicator, and a second mapping of a second number of transmit chains to a second set of precoding matrix indicators.

* * * * *